United States Patent
Kim et al.

(10) Patent No.: US 10,911,412 B2
(45) Date of Patent: Feb. 2, 2021

(54) VEHICLE DATA RESERVATION SERVICE

(71) Applicant: TOYOTA JIDOSHA KABUSHIKI KAISHA, Toyota (JP)

(72) Inventors: BaekGyu Kim, Mountain View, CA (US); Zhihao Jiang, Mountain View, CA (US)

( * ) Notice: Subject to any disclaimer, the term of this patent is extended or adjusted under 35 U.S.C. 154(b) by 281 days.

(21) Appl. No.: 16/172,497

(22) Filed: Oct. 26, 2018

(65) Prior Publication Data

US 2020/0137028 A1   Apr. 30, 2020

(51) Int. Cl.
| G06F 16/335 | (2019.01) |
| H04L 29/06  | (2006.01) |
| G06F 11/32  | (2006.01) |
| G06Q 10/06  | (2012.01) |

(52) U.S. Cl.
CPC ........... *H04L 63/04* (2013.01); *G06F 11/323* (2013.01); *G06F 16/335* (2019.01); *G06Q 10/0639* (2013.01)

(58) Field of Classification Search
CPC ... H04L 63/04; G06Q 10/0639; G06F 16/335; G06F 11/323
USPC ...................................................... 709/226
See application file for complete search history.

(56) References Cited

U.S. PATENT DOCUMENTS

| 7,715,037 | B2  |   | 5/2010  | Castellani et al. |
| 8,990,551 | B2  |   | 3/2015  | Shafi |
| 9,674,042 | B2  |   | 6/2017  | Lissack |
| 2016/0357188 | A1 | * | 12/2016 | Ansari ............... G06K 9/00805 |
| 2017/0193629 | A1 |   | 7/2017  | Subramaniyan et al. |
| 2018/0006966 | A1 | * | 1/2018  | James ..................... H04L 43/16 |
| 2019/0239193 | A1 | * | 8/2019  | Rudolf .................. H04W 88/02 |
| 2020/0205062 | A1 | * | 6/2020  | Azizi .................... H04W 48/10 |

* cited by examiner

*Primary Examiner* — Frantz B Jean
(74) *Attorney, Agent, or Firm* — Burbage Law, P.C.; Jon-Michael Burbage; Elizabeth Ruzich

(57) ABSTRACT

The disclosure includes embodiments for reserving an infrastructure resource on an infrastructure device. In some embodiments, a method includes monitoring an execution status of a reservation result on the infrastructure device. The reservation result describes a reservation of the infrastructure resource on the infrastructure device for providing a V2I service. The method includes receiving feedback data describing the execution status of the reservation result from the infrastructure device. The method includes modifying one or more reservation criteria based on the feedback data. The one or more reservation criteria are used to create the reservation result. The method includes modifying the reservation result based on the one or more reservation criteria so that a shortage or an excess of the infrastructure resource for execution of the V2I service is avoided. The avoidance of the shortage or the excess improves over time as more feedback data is received.

20 Claims, 25 Drawing Sheets

VEHICLE DATA RESERVATION SERVICE

BACKGROUND

The specification relates to systematically reserving an infrastructure resource to avoid a shortage or an excess of the infrastructure resource for execution of a Vehicle-to-Infrastructure (V2I) service.

Many vehicle applications are expected for vehicles to communicate with various types of infrastructure devices. These infrastructure devices may include one or more of the following: roadside units; and small size computing servers (i.e., so called edge servers or fog servers). Such infrastructure devices may be owned by government, telecommunication companies or original equipment manufacturers (OEMs). For example, vehicles may receive warning messages from infrastructure devices describing hazardous conditions (e.g., unexpected severe weather conditions, construction sites or accident sites), the knowledge of which may assist the vehicles to avoid a collision; and a group of vehicles can be automatically controlled by the infrastructure devices together to maintain small gaps (e.g., vehicle platooning). Operation of such V2I applications needs vehicles to utilize various types of digital data and resources of the infrastructure devices such as computation power, storage and so on. Therefore, it is needed for OEMs to reserve a sufficient amount of resources and digital data for correct operations of the V2I applications.

SUMMARY

Described are embodiments of a resource reservation system installed in a cloud server. The resource reservation system is operable to automatically reserve infrastructure resources (e.g., digital data and computing resources) of infrastructure devices (e.g., roadside units, edge servers or fog servers) to avoid a shortage or an excess of the infrastructure resources for execution of V2I services.

It should be noted that it is not trivial to reserve resources (e.g., data, computing resources, network resources and other types of resources) of infrastructure devices since many aspects are co-related to each other in a complex way, such as a vehicle density, an application size, a communication rate, a timing when an application is being used and so on. The resource reservation system described herein allows reservation of the infrastructure resources on infrastructure devices so that appropriate amounts of the infrastructure resources are prepared for correct operation of a wide range of V2I applications based on one or more reservation criteria.

In some embodiments, the resource reservation system described herein collects infrastructure data from various data sources via a data collection interface. This interface can accept different data formats such as Extensible Markup Language (XML) or JavaScript Object Notation (JSON). The data sources can be OEM-owned or third-party-owned infrastructure devices.

In some embodiments, the data collection interface distinguishes an origin of the infrastructure data according to a confidence level and details included in the infrastructure data. For example, infrastructure data coming from an OEM-owned infrastructure device may be highly trusted containing many details, while infrastructure data coming from a third-party infrastructure device may be less trusted without sufficient details (e.g., due to a contract between OEM and the third party).

In some embodiments, the resource reservation system described herein allows users (e.g., engineers) to specify filtering criteria that can be used to filter the infrastructure data to generate filtered data for resource reservation. For example, a criterion may specify a specific region where an infrastructure resource of interest is located; a criterion may specify a particular highway of interest or a Global Positioning System (GPS) position of an area of interest. In addition, a criterion may specify a range of dates of interest or a time period of interest. A criterion may also specify an infrastructure resource of interest such as a memory or a central processing unit (CPU) and so on. For example, the infrastructure resource of interest is the same as an infrastructure resource to be reserved, and the time period of interest is the same as a scheduled time period during which the infrastructure resource is reserved.

In some embodiments, the resource reservation system described herein is operable to selectively reserve an infrastructure resource for a single infrastructure device or multiple infrastructure devices based on the filtered data and one or more reservation criteria. The one or more reservation criteria can be defined by users (e.g., user-defined criteria). For example, the one or more reservation criteria may specify one or more of the following: a minimum and maximum amount of computing resources; a type of V2I applications allowed during a certain day or a certain time of the day; the number of requests allowed for each V2I application; and so on. This list of the reservation criteria is not intended to be limiting. These criteria are compared with a current usage of the infrastructure resource by the resource reservation system. The resource reservation system automatically allocates more of the infrastructure resource or less of the infrastructure resource based on the reservation criteria, and outputs a reservation result. The reservation result may be visualized with an appropriate format such as a tabular format, a bar graph or a time-series graph.

In some embodiments, a user may also manually modify the reservation result by modifying the visualized format in a more conservative way (or a less conservative way). A base map can be imported from a third-party map provider via open Application Programming Interfaces (APIs). The reservation result is superimposed on the imported base map. The resource reservation system then automatically communicates with the infrastructure device to reserve the infrastructure resource based on the reservation result.

In some embodiments, the resource reservation system described herein selectively monitors usages of the infrastructure resource on infrastructure devices via user configurations and raises alerts in case that the usages of the infrastructure resource violate the configurations. In addition, the resource reservation system reserves an infrastructure resource on a target infrastructure device according to different types of criteria (e.g., application types, memory usages, etc.) to avoid a shortage or an excess of the usage of the infrastructure resource. By comparison, existing solutions do not detect when the usage of the infrastructure resource on the infrastructure device violates a user-defined configuration. Existing solutions do not raise alerts about such violations or reserve the infrastructure resource in such a way to correct these violations or prevent the violations from occurring.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method including: monitoring an execution status of a reservation result on an infrastructure device, where the reservation result describes a reservation of an infrastructure resource on the infrastructure device for providing a vehicle-to-infrastructure (V2I) service; receiving feedback data describing the execution status of the reservation result from the infrastructure device; modifying one or more reservation criteria based on the feedback data, where the one or more reservation criteria are used to create the reservation result; and modifying the reservation result based at least in part on the one or more reservation criteria so that a shortage or an excess of the infrastructure resource for execution of the V2I service is avoided, where the avoidance of the shortage or the excess improves over time as more feedback data is received. Other embodiments of this aspect include corresponding computer systems, apparatus, and computer programs recorded on one or more computer storage devices, each configured to perform the actions of the methods.

Implementations may include one or more of the following features. The method further including: retrieving infrastructure data from the infrastructure device; filtering the infrastructure data based on one or more filtering criteria to generate filtered data, where the filtered data satisfies the one or more filtering criteria; and creating the reservation result based on the filtered data and the one or more reservation criteria. The method where creating the reservation result based on the filtered data and the one or more reservation criteria further includes: comparing the filtered data with the one or more reservation criteria to determine an amount of the infrastructure resource to be additionally allocated or deallocated; and generating the reservation result that additionally allocates or deallocates the amount of the infrastructure resource on a scheduled time. The method where the one or more filtering criteria include data describing one or more of: a region where an infrastructure resource of interest is located; a road of interest; a location of interest; an area of interest; a time range of interest; the infrastructure resource of interest; and a type of the infrastructure resource of interest. The method where the infrastructure data includes data describing one or more of: a signal strength of the infrastructure device; a location of the infrastructure device; a memory usage of the infrastructure device; a processor usage of the infrastructure device; a storage usage of the infrastructure device; an uplink network usage of the infrastructure device; a downlink network usage of the infrastructure device; a total number of pass-through vehicles that goes by the infrastructure device; an average speed of the pass-through vehicles; a total number of resource requests from the pass-through vehicles; a total number of resource grants provided to the pass-through vehicles by the infrastructure device; and a total number of resource denials provided to the pass-through vehicles by the infrastructure device. The method further including: distinguishing an origin of the infrastructure data based on one or more of a confidence level of the infrastructure data and details in the infrastructure data. The method further including: monitoring a status of the infrastructure resource; and updating the reservation result based on the status of the infrastructure resource in real time to improve allocation efficiency of the infrastructure resource. The method further including: importing a base map from a map provider; and superimposing the reservation result on the base map so that the reservation result is visualized on the base map. The method where the infrastructure resource reserved on the infrastructure device includes one or more of: data stored in the infrastructure device; computation power of the infrastructure device; memory of the infrastructure device; storage of the infrastructure device; a bandwidth of the infrastructure device; an uplink network bandwidth of the infrastructure device; a downlink network bandwidth of the infrastructure device; one or more V2I applications or services provided by the infrastructure device; and requests of the one or more V2I applications to be processed by the infrastructure device. The method where the one or more reservation criteria include data describing one or more of: a minimum amount of the infrastructure resource to be reserved; a maximum amount of the infrastructure resource to be reserved; a type of a V2I application allowed during a time period; and a total number of requests allowed for the V2I application during the time period. The method further including: detecting an occurrence of an alert triggering event associated with the infrastructure resource; and generating an alert message responsive to the occurrence of the alert triggering event. The method where the alert triggering event includes an event indicating a violation of a usage of the infrastructure resource on the infrastructure device or an event describing that the usage of the infrastructure resource reaches an alert threshold. Implementations of the described techniques may include hardware, a method or process, or computer software on a computer-accessible medium.

One general aspect includes a system including a processor and a non-transitory memory storing computer code which, when executed by the processor, causes the processor to: monitor an execution status of a reservation result on an infrastructure device, where the reservation result describes a reservation of an infrastructure resource on the infrastructure device for providing a vehicle-to-infrastructure (V2I) service; receive feedback data describing the execution status of the reservation result from the infrastructure device; modify one or more reservation criteria based on the feedback data, where the one or more reservation criteria are used to create the reservation result; and modify the reservation result based at least in part on the one or more reservation criteria so that a shortage or an excess of the infrastructure resource for execution of the V2I service is avoided, where the avoidance of the shortage or the excess improves over time as more feedback data is received. Other embodiments of this aspect include corresponding computer systems, apparatus, and computer programs recorded on one or more computer storage devices, each configured to perform the actions of the methods.

Implementations may include one or more of the following features. The system where the computer code which, when executed by the processor, causes the processor further to: retrieve infrastructure data from the infrastructure device; filter the infrastructure data based on one or more filtering criteria to generate filtered data, where the filtered data satisfies the one or more filtering criteria; and create the reservation result based on the filtered data and the one or more reservation criteria. The system where the computer code which, when executed by the processor, causes the processor to create the reservation result based on the filtered data and the one or more reservation criteria at least by: comparing the filtered data with the one or more reservation criteria to determine an amount of the infrastructure resource to be additionally allocated or deallocated; and generating the reservation result that additionally allocates or deallocates the amount of the infrastructure resource on a scheduled time. The system where the one or more filtering criteria include data describing one or more of: a region where an infrastructure resource of interest is located; a road of interest; a location of interest; an area of interest; a time range of interest; the infrastructure resource of interest; and a type of the infrastructure resource of interest. The system where the computer code which, when executed by the processor, causes the processor further to: distinguish an origin of the infrastructure data based on one or more of a confidence level of the infrastructure data and details in the infrastructure data. The system where the computer code which, when executed by the processor, causes the processor further to: monitor a status of the infrastructure resource; and update the reservation result based on the status of the infrastructure resource in real time to improve allocation efficiency of the infrastructure resource. The system where the computer code which, when executed by the processor, causes the processor further to: import a base map from a map provider; and superimpose the reservation result on the base map so that the reservation result is visualized on the base map. Implementations of the described techniques may include hardware, a method or process, or computer software on a computer-accessible medium.

One general aspect includes a computer program product including a non-transitory memory storing computer-executable code that, when executed by a processor, causes the processor to: monitor an execution status of a reservation result on an infrastructure device, where the reservation result describes a reservation of an infrastructure resource on the infrastructure device for providing a vehicle-to-infrastructure (V2I) service; receive feedback data describing the execution status of the reservation result from the infrastructure device; modify one or more reservation criteria based on the feedback data, where the one or more reservation criteria are used to create the reservation result; and modify the reservation result based at least in part on the one or more reservation criteria so that a shortage or an excess of the infrastructure resource for execution of the V2I service is avoided, where the avoidance of the shortage or the excess improves over time as more feedback data is received. Other embodiments of this aspect include corresponding computer systems, apparatus, and computer programs recorded on one or more computer storage devices, each configured to perform the actions of the methods. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

A connectivity trend in an automotive domain allows vehicles to communicate with various types of devices such as other vehicles, infrastructure devices or pedestrian devices. In particular, the communication between vehicles and infrastructure devices (V2I communication) makes new types of services possible, which could not be done by in-vehicle systems only.

A vehicle may be equipped with V2I applications that can interact with various types of infrastructure devices. Examples of the infrastructure devices may include, but are not limited to, a roadside unit (e.g., traffic lights), a cellular base station (e.g., a cell tower), an OEM-managed edge/fog server and a cloud server, etc. Examples of the V2I applications may include, but are not limited to, an advanced infotainment system (e.g., an infotainment system that can trigger alarms for any hazardous road conditions), a dynamic high-definition (HD) map application, a ride share application, and vehicle platooning (e.g., multiple vehicles controlled by an infrastructure device to maintain short gaps between the vehicles), etc.

In order to operate such V2I applications, it is needed to utilize resources of an infrastructure device such as memory or computation power of the infrastructure device. It is also needed to keep track of a usage of the infrastructure resource on the infrastructure device so that an additional amount of the infrastructure resource can be allocated if needed or an excessive amount of the infrastructure resource can be deallocated depending on a total number of requests from vehicles passing through the infrastructure device.

Embodiments of a resource reservation system that is operable to automatically reserve an infrastructure resource for providing a V2I service are now described. The resource reservation system can systematically reserve a usage of the infrastructure resource on the infrastructure device to avoid a shortage or an excess of the infrastructure resource for the execution of the V2I service. The resource reservation system is operable to selectively reserve the infrastructure resource based on one or more reservation criteria. The resource reservation system can take an input from a user to generate one or more user-defined reservation criteria that specify, for example, a type of the infrastructure resource and geographical information of the infrastructure resource to be reserved and can reserve an appropriate amount of the infrastructure resource according to the one or more reservation criteria. In addition, the resource reservation system is operable to raise an alert in response to detecting any violation of the usage of the infrastructure resource.

Example Overview

Figure 1A:
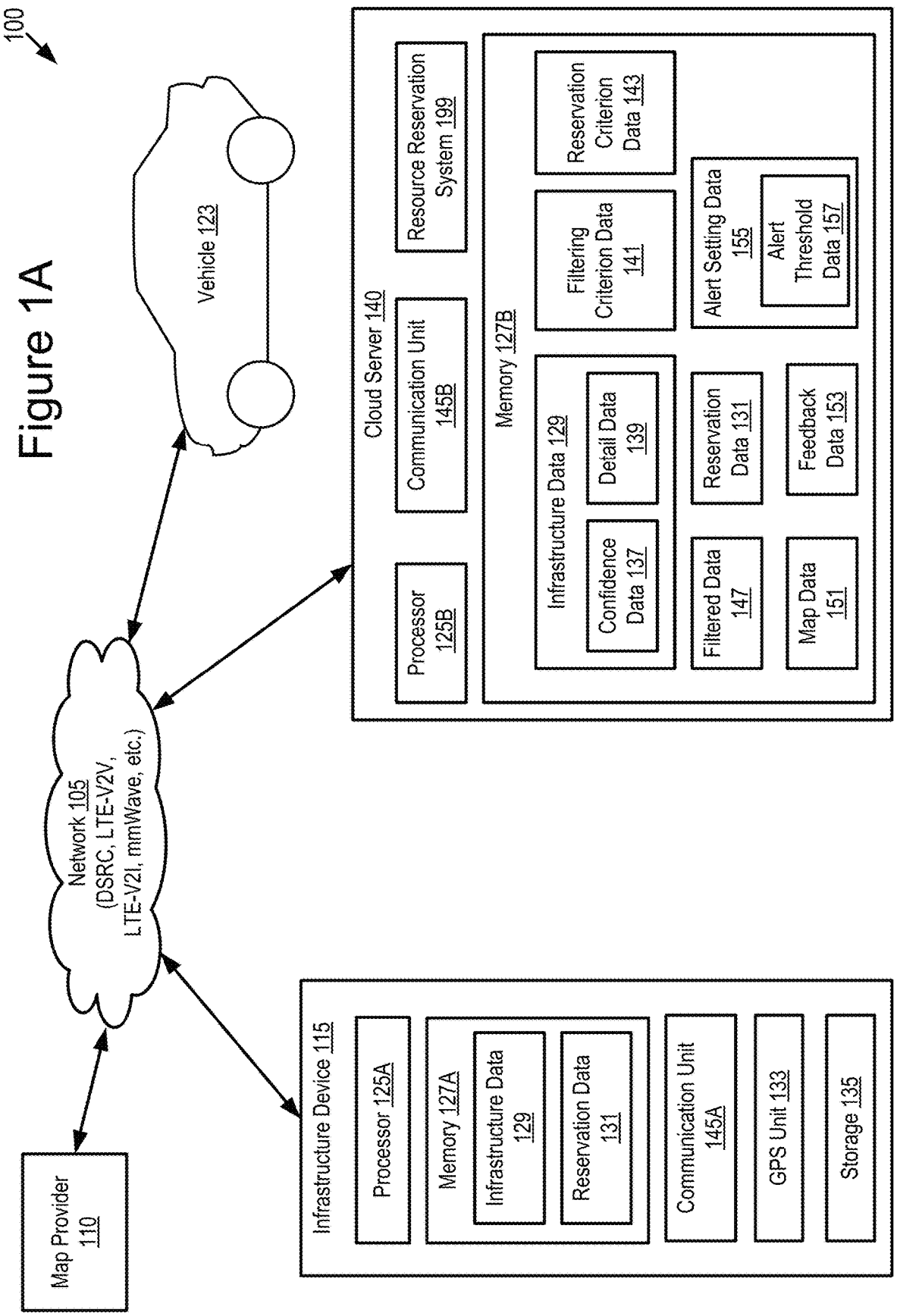
FIG. 1A is a block diagram illustrating an operating environment for a resource reservation system according to some embodiments.

Referring to FIG. 1A, depicted is an operating environment 100 for a resource reservation system 199. The operating environment 100 may include one or more of the following elements: a vehicle 123; a map provider 110; an infrastructure device 115; and a cloud server 140. These elements of the operating environment 100 may be communicatively coupled to a network 105. Although only one vehicle 123, one map provider 110, one infrastructure device 115, one cloud server 140 and one network 105 are depicted in FIG. 1A, in practice the operating environment 100 may include one or more vehicles 123, one or more map providers 110, one or more infrastructure devices 115, one or more cloud servers 140 and one or more networks 105.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, Dedicated Short Range Communication (DSRC), full-duplex wireless communication, mmWave, WiFi (infrastructure mode), WiFi (ad-hoc mode), visible light communication, TV white space communication and satellite communication. The network 105 may also include a mobile data network that may include 3G, 4G, Long-Term Evolution (LTE), LTE-Vehicle-to-Vehicle (LTE-V2V), LTE-Vehicle-to-Infrastructure (LTE-V2I), LTE-Vehicle-to-Everything (LTE-V2X), LTE-Device-to-Device (LTE-D2D), Voice over LTE (VoLTE), LTE-5G, mmWave or any other mobile data network or combination of mobile data networks. Further, the network 105 may include one or more IEEE 802.11 wireless networks.

The vehicle 123 may be any type of vehicle. For example, the vehicle 123 may include one of the following types of vehicles: a car; a truck; a sports utility vehicle; a bus; a semi-truck; a drone or any other roadway-based conveyance.

In some embodiments, the vehicle 123 may include an autonomous vehicle or a semi-autonomous vehicle. For example, the vehicle 123 may include an Advanced Driver-Assistance System (ADAS). The ADAS system may provide some or all of the functionality that provides autonomous functionality.

The vehicle 123 may include one or more of the following elements (not depicted in the figure): a processor; a memory; a communication unit; a GPS unit; a vehicle sensor set; and an electronic control unit (ECU), etc.

In some embodiments, one or more V2I applications are installed in the ECU or another component of the vehicle 123. When executed by a processor of the vehicle 123, a V2I application installed in the vehicle 123 may send a request for accessing a V2I service to the infrastructure device 115 so that the request is processed by the infrastructure device 115. For example, assume that a V2I application is a dynamic HD map application. When executed by the processor of the vehicle 123, the dynamic HD map application sends a request for a HD map to a roadside unit, causing the roadside unit to forward the request to the map provider 110 via the network 105. Next, the map provider 110 retrieves map data describing the HD map from an associated storage device responsive to receiving the request, and then sends the map data to the infrastructure device 115 via the network 105. Next, the infrastructure device 115 sends the map data to the vehicle 123 for providing the HD map on the vehicle 123.

Examples of a V2I application may include, but are not limited to, an advanced infotainment system (e.g., including a video streaming application, au audio streaming application such as a music playing application), a dynamic HD map application, vehicle platooning, a social networking application and a ride share application, etc.

Examples of a V2I service include, but are not limited to, a video streaming service, an audio streaming service (e.g., a music streaming service, a podcast service), a radio service, a map service, a navigation service, a social networking service and a ride share service, etc.

In some embodiments, the vehicle 123 may be a DSRC-equipped vehicle. A DSRC-equipped vehicle is a vehicle which: (1) includes a DSRC radio; (2) includes a DSRC-compliant Global Positioning System (GPS) unit; and (3) is operable to lawfully send and receive DSRC messages in a jurisdiction where the DSRC-equipped vehicle is located. A DSRC radio is hardware that includes a DSRC receiver and a DSRC transmitter. The DSRC radio is operable to wirelessly send and receive DSRC messages. A DSRC-compliant GPS unit is operable to provide positional information for a vehicle (or some other DSRC-equipped device that includes the DSRC-compliant GPS unit) that has lane-level accuracy. For example, a DSRC-compliant GPS unit provides GPS data that describes a position of the DSRC-compliant GPS unit with an accuracy of plus or minus 1.5 meters of the actual position of the DSRC-compliant GPS unit. This degree of accuracy is referred to as "lane-level accuracy" since, for example, a lane of a roadway is generally about 3 meters wide, and an accuracy of plus or minus 1.5 meters is sufficient to identify which lane a vehicle is traveling in on a roadway.

Examples of the infrastructure device 115 may include, but are not limited to, a roadside unit (e.g., traffic lights), a cellular base station (e.g., a cell tower), an OEM-managed edge server, an OEM-managed fog server, a third-party server, and a cloud server, etc.

In some embodiments, the infrastructure device 115 includes a processor 125A, a memory 127A, a communication unit 145A, a GPS unit 133 and a storage 135.

The processor 125A includes an arithmetic logic unit, a microprocessor, a general-purpose controller, or some other processor array to perform computations and provide electronic display signals to a display device. The processor 125A processes data signals and may include various computing architectures including a complex instruction set computer (CISC) architecture, a reduced instruction set computer (RISC) architecture, or an architecture implementing a combination of instruction sets. The infrastructure device 115 may include one or more processors 125A. Other processors, operating systems, sensors, displays, and physical configurations may be possible.

The memory 127A stores instructions or data that may be executed by the processor 125A. The instructions or data may include code for performing the techniques described herein. The memory 127A may be a dynamic random-access memory (DRAM) device, a static random-access memory (SRAM) device, flash memory, or some other memory device. In some embodiments, the memory 127A also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The infrastructure device 115 may include one or more memories 127A.

The memory 127A may store one or more of the following elements: infrastructure data 129; and reservation data 131.

The infrastructure data 129 includes data related to one or more infrastructure resources of the infrastructure device 115. In some embodiments, the infrastructure data 129 includes data describing a usage or a status of an infrastructure resource on the infrastructure device 115. For example, the infrastructure data 129 includes data describing one or more of: a signal strength of the infrastructure device 115; a location of the infrastructure device 115; a memory usage of the infrastructure device 115; a processor usage of the infrastructure device 115; a storage usage of the infrastructure device 115; an uplink network usage of the infrastructure device 115; a downlink network usage of the infrastructure device 115; a total number of pass-through vehicles that goes by the infrastructure device 115; an average speed of the pass-through vehicles; a total number of resource requests from the pass-through vehicles; a total number of resource grants provided to the pass-through vehicles by the infrastructure device 115; and a total number of resource denials provided to the pass-through vehicles by the infrastructure device 115, etc.

The reservation data 131 includes data describing a reservation result to be executed on the infrastructure device 115 on a scheduled time. In some embodiments, the reservation result describes a reservation of an infrastructure resource on the infrastructure device 115 for providing a V2I service. For example, the reservation result describes a reservation of a certain amount of memory capacity and a certain amount of computation power for executing a number of requests for a video streaming service during a particular time period. Further examples of the reservation result are provided in FIGS. 7A-8B and 10A-13D.

Examples of the infrastructure resource reserved on the infrastructure device 115 include, but are not limited to: data stored in the infrastructure device 115; computation power of the infrastructure device 115; memory of the infrastructure device 115; storage of the infrastructure device 115; a bandwidth of the infrastructure device 115; an uplink network bandwidth of the infrastructure device 115; a downlink network bandwidth of the infrastructure device 115; one or more V2I applications or services provided by the infrastructure device 115; and a total number of requests from a V2I application to be processed by the infrastructure device 115, etc.

The communication unit 145A transmits and receives data to and from the network 105 or to another communication channel. In some embodiments, the communication unit 145A may include a DSRC transceiver, a DSRC receiver and other hardware or software necessary to make the infrastructure device 115 a DSRC-enabled device. For example, the communication unit 145A includes a DSRC antenna configured to broadcast DSRC messages via the network. The DSRC antenna may also transmit BSM messages at a fixed interval (e.g., every 0.1 seconds, at a time interval corresponding to a frequency range from 1.6 Hz to 10 Hz, etc.) that is user configurable.

In some embodiments, the communication unit 145A includes a port for direct physical connection to the network 105 or to another communication channel. For example, the communication unit 145A includes a USB, SD, CAT-5, or similar port for wired communication with the network 105. In some embodiments, the communication unit 145A includes a wireless transceiver for exchanging data with the network 105 or other communication channels using one or more wireless communication methods, including: IEEE 802.11; IEEE 802.16, BLUETOOTH®; EN ISO 14906: 2004 Electronic Fee Collection—Application interface EN 11253:2004 Dedicated Short-Range Communication— Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471,387 filed on Aug. 28, 2014 and entitled "Full-Duplex Coordination System"; or another suitable wireless communication method.

In some embodiments, the communication unit 145A includes a full-duplex coordination system as described in U.S. patent application Ser. No. 14/471,387 filed on Aug. 28, 2014 and entitled "Full-Duplex Coordination System."

In some embodiments, the communication unit 145A includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145A includes a wired port and a wireless transceiver. The communication unit 145A also provides other conventional connections to the network 105 for distribution of files or media objects using standard network protocols including TCP/IP, HTTP, HTTPS, and SMTP, millimeter wave, DSRC, etc.

In some embodiments, the GPS unit 133 is a conventional GPS unit. For example, the GPS unit 133 may include hardware that wirelessly communicates with a GPS satellite to retrieve data that describes a geographic location of the infrastructure device 115. For example, the GPS unit 133 retrieves GPS data describing the geographic location of the infrastructure device 115 from one or more GPS satellites. In some embodiments, the GPS unit 133 is a DSRC-compliant GPS unit that is operable to provide GPS data describing the geographic location of the infrastructure device 115 with lane-level accuracy.

As used herein, the words "geographic location," "location," "geographic position" and "position" refer to a latitude and longitude of an object such as the infrastructure device 115 or the vehicle 123.

The storage 135 can be a non-transitory storage medium that stores data for providing the functionality described herein. The storage 135 may be a dynamic random-access memory (DRAM) device, a static random-access memory (SRAM) device, flash memory, or some other memory devices. In some embodiments, the storage 135 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The cloud server 140 can be a computing device including one or more processors and one or more memories. In some embodiments, the cloud server 140 includes one or more of the following elements: a processor 125B; a memory 127B; a communication unit 145B; and a resource reservation system 199.

The communication unit 145A of the infrastructure device 115 and the communication unit 145B of the cloud server 140 may be referred to herein collectively or individually as the "communication unit 145" since, for example, the communication unit 145A of the infrastructure device 115 provides similar functionality to the components of the infrastructure device 115 as does the communication unit 145B of the cloud server 140. For similar reasons, the description provided herein uses the following terms when referring to elements that are common to the infrastructure device 115 and the cloud server 140 and provide similar functionality to the infrastructure device 115 or the cloud server 140: the "processor 125" when referring to the processor 125A and the processor 125B, collectively or individually; and the "memory 127" when referring to the memory 127A and the memory 127B, collectively or individually.

In some embodiments, the memory 127 of the cloud server 140 stores one or more of the following elements: the infrastructure data 129; filtering criterion data 141; reservation criterion data 143; filtered data 147; the reservation data 131; map data 151; feedback data 153; and alert setting data 155. The infrastructure data 129 and the reservation data 131 are described above, and similar description will not be repeated here.

In some embodiments, the infrastructure data 129 includes confidence data 137 and detail data 139. An origin of the infrastructure data 129 can be distinguished by the confidence data 137 and the detailed data 139. The confidence data 137 is data describing a confidence level of infrastructure data from a particular infrastructure device, and the detail data 139 is data describing details of the infrastructure data. For example, different sets of infrastructure data from different infrastructure devices may be assigned with different confidence levels and have different levels of details. In a further example, a set of infrastructure data from a trusted data source (e.g., an OEM-controlled infrastructure device) can have a higher confidence level and more details than a set of infrastructure data from a third-party data source (e.g., a third-party controlled infrastructure device).

The quality of the resource reservation depends on a quality of the infrastructure data received from the infrastructure device 115. Examples of infrastructure data with details expected from the infrastructure device 115 are provided in the following Table 1. It should be noted that some items of the infrastructure data in Table 1 might not be available from all infrastructure devices. Since some infrastructure devices belong to OEMs while some are not, there may be some restrictions in retrieving data. Such confidence and accuracy on the infrastructure data are annotated by a data collection interface 204 described below with reference to FIG. 2.

TABLE 1

Example infrastructure data to visualize usages of infrastructure resources on an infrastructure device

| Item | Note | Example |
| --- | --- | --- |
| Signal Strength | A degree of signal strength of the infrastructure device (e.g., WiFi signal strength, DSRC signal strength) | High/medium/low or numeric scale (1-5) |
| GPS location | A location of the infrastructure device | 37°23'35.0" N 122°08'10.1" W |
| Memory usage | A percentage of the used memory of the infrastructure device | 80% utilization (e.g., 80 MB/100 MB) |
| Processor usage | A percentage of the CPU usage | 30% utilization |
| Storage usage | A percentage of the permanent disk storage usage | 20% (e.g., 2 TB/10 TB) |
| Uplink network usage | An amount (or number) of bytes transmitted from vehicles to the infrastructure device | 10 MB/second |
| Downlink network usage | An amount (or number) of bytes transmitted from the infrastructure device to vehicles | 20 MB/second |
| A number of pass-through vehicles | A number of vehicles passing through a region covered by the infrastructure device | 100 vehicles/minute |
| An average vehicle speed | An average speed of the pass-through vehicles | 60 mph |
| A number of resource requests | A total number of resource requests from the pass-through vehicles | 2000 requests/minute |

TABLE 1-continued

Example infrastructure data to visualize usages of infrastructure resources on an infrastructure device

| Item | Note | Example |
| --- | --- | --- |
| A number of resource grants | A total number of resource requests granted by the infrastructure device to the pass-through vehicles | 1500 requests/minute |
| A number of resource denials | A total number of resource requests denied by the infrastructure device to the pass-through vehicles | 500 requests/minute |

The filtering criterion data 141 is data describing one or more filtering criteria. For example, the filtering criterion data 141 includes data describing one or more of the following filtering criteria: a region where the infrastructure resource of interest is located; a road (e.g., a highway) of interest; a location of interest; an area of interest; a time range of interest (e.g., 8:00 am-9:00 am); the infrastructure resource of interest; and a type of the infrastructure resource of interest, etc. In some embodiments, the infrastructure resource of interest is the same as the infrastructure resource to be reserved, and the time range of interest is the same as a scheduled time range during which the infrastructure resource is to be reserved.

The reservation criterion data 143 is data describing one or more reservation criteria. For example, the reservation criterion data 143 includes data describing one or more of the following reservation criteria: a minimum amount of the infrastructure resource to be reserved; a maximum amount of the infrastructure resource to be reserved; a type of a V2I application allowed during a particular time period; and a total number of requests of the V2I application during the time period.

The filtered data 147 is data generated by filtering the infrastructure data 129 by one or more filtering criteria described by the filtering criterion data 141. In some embodiments, the filtered data 147 includes data describing a usage of an infrastructure resource during a particular time. For example, assume that a filtering criterion specifies: (1) a type of resources is memory usage; (2) a region of interest is an area covered by a particular roadside unit; and (3) a time of day is from 8:00 am to 9:00 am on Monday. Based on this filtering criterion, the filtered data 147 is generated which describes that a memory usage on the particular roadside unit from 8:00 am to 9:00 am on Monday is 80% of the memory capacity.

The map data 151 is data describing a base map imported from the map provider 110. The base map can be a third-party map. Examples of a base map are provided in FIGS. 9, 10B, 11B and 12A-13D.

The feedback data 153 is data fed back from the infrastructure device 115 where the infrastructure resource is reserved. In some embodiments, the feedback data 153 includes data describing an execution status of the reservation result in response to the reservation result being executed on the infrastructure device 115. For example, the feedback data 153 includes data indicating that the reservation result is executed successfully on the infrastructure device 115 or fails to be executed on the infrastructure device 115. In another example, assume that the reservation result indicates to reserve 100 MB of the memory for a particular V2I application on a scheduled time (e.g., from 10:00 am to 11:00 am on Monday). When the reservation result is executed on the infrastructure device 115 on the scheduled time, 100 MB of the memory is allocated to the V2I application. Based on an actual usage of the memory on the scheduled time, the feedback data 153 is generated and includes data describing that 90% of the allocated memory (90 MB/100 MB) is used during the scheduled time.

In some embodiments, the feedback data 153 includes data describing a status of the infrastructure resource. For example, the feedback data 153 includes data describing that an additional amount of the infrastructure resource (e.g., new memory) is added to the infrastructure device 115. In another example, the feedback data 153 includes data describing that a portion of the infrastructure resource (e.g., a particular memory) malfunctions. Other examples of the feedback data 153 are possible.

The alert setting data 155 is data describing a setting for providing an alert triggering event. For example, the alert setting data 155 describes one or more conditions to trigger an alert triggering event in case of a shortage or an excess of the infrastructure resource. Examples of an alert triggering event include, but are not limited to, an event indicating a violation of a usage of the infrastructure resource on the infrastructure device 115 and an event describing that the usage of the infrastructure resource reaches an alert threshold. The alert setting data 150 can be configured by a user.

The alert setting data 155 further includes alert threshold data 157. The alert threshold data 157 describes an alert threshold. The alert threshold can be configured by a user.

In some embodiments, the resource reservation system 199 includes software that is operable, when executed by the processor 125, to cause the processor 125 to execute one or more steps of methods 400, 500 and 600 described below with reference to FIGS. 4-6.

In some embodiments, the resource reservation system 199 may be implemented using hardware including a field-programmable gate array ("FPGA") or an application-specific integrated circuit ("ASIC"). In some other embodiments, the resource reservation system 199 may be implemented using a combination of hardware and software. The resource reservation system 199 may be stored in a combination of the devices (e.g., servers or other devices), or in one of the devices.

The resource reservation system 199 is described below in more detail with reference to FIGS. 2-6.

The map provider 110 is a computing device including one or more processors and one or more memories. In some embodiments, the map provider 110 is operable to provide map data describing a base map to one or more of the vehicle 123, the cloud server 140 and the infrastructure device 115 responsive to a request for the base map. The map provider 110 can be a third-party map provider.

Figure 1B:
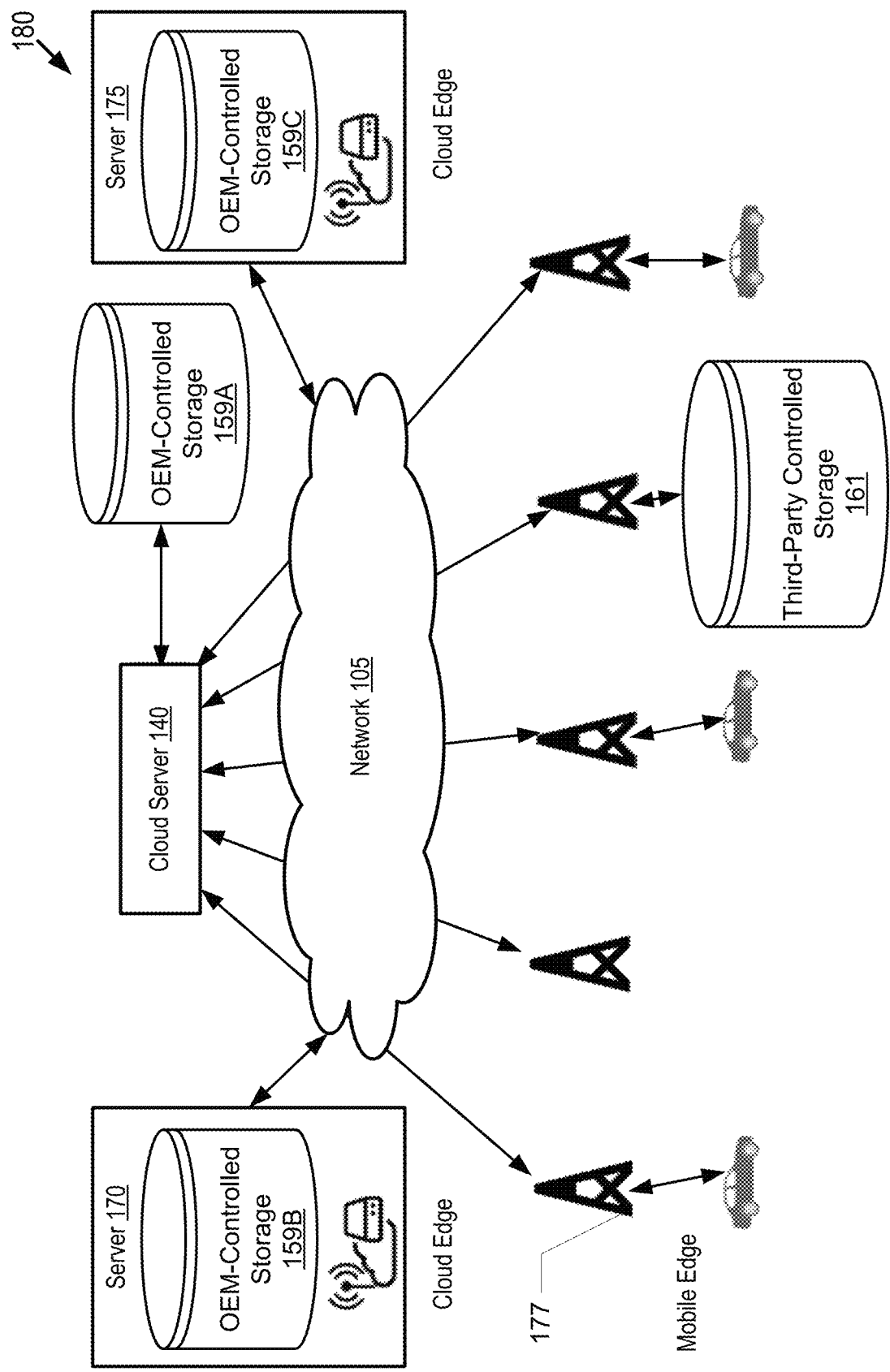
FIG. 1B is a block diagram illustrating an eco-system of V2I applications according to some embodiments.

Referring to FIG. 1B, an eco-system 180 for V2I applications is illustrated according to some embodiments. In the illustrated embodiment, the cloud server 140 is communicatively coupled to an OEM-controlled storage 159A. There are two example servers 170 and 175 illustrated on a cloud edge and multiple cellular base stations 177 illustrated on a mobile edge. For example, each of the servers 170 and 175 can be an infrastructure device such as an edge server or a fog server. The server 170 includes an OEM-controlled storage 159B. The server 175 includes an OEM-controlled storage 159C. The OEM-controlled storage 159A, 159B or 159C (referred to as "OEM-controlled storage 159," collectively or individually) can be a trusted data source that provides infrastructure data with a high confidence level and various details.

The cellular base stations 177 can be communicatively coupled to vehicles, OEM-controlled storages 159 and third-party controlled storages 161. For example, as illustrated in FIG. 1B, a cellular base station 177 is communicatively coupled to a third-party controlled storage 161. The third-party controlled storage 161 can be a data source less trusted than the OEM-controlled storage 159. For example, the third-party controlled storage 161 provides infrastructure data with a lower confidence level and less details than that of the OEM-controlled storage 159.

Example Computer System

Figure 2:
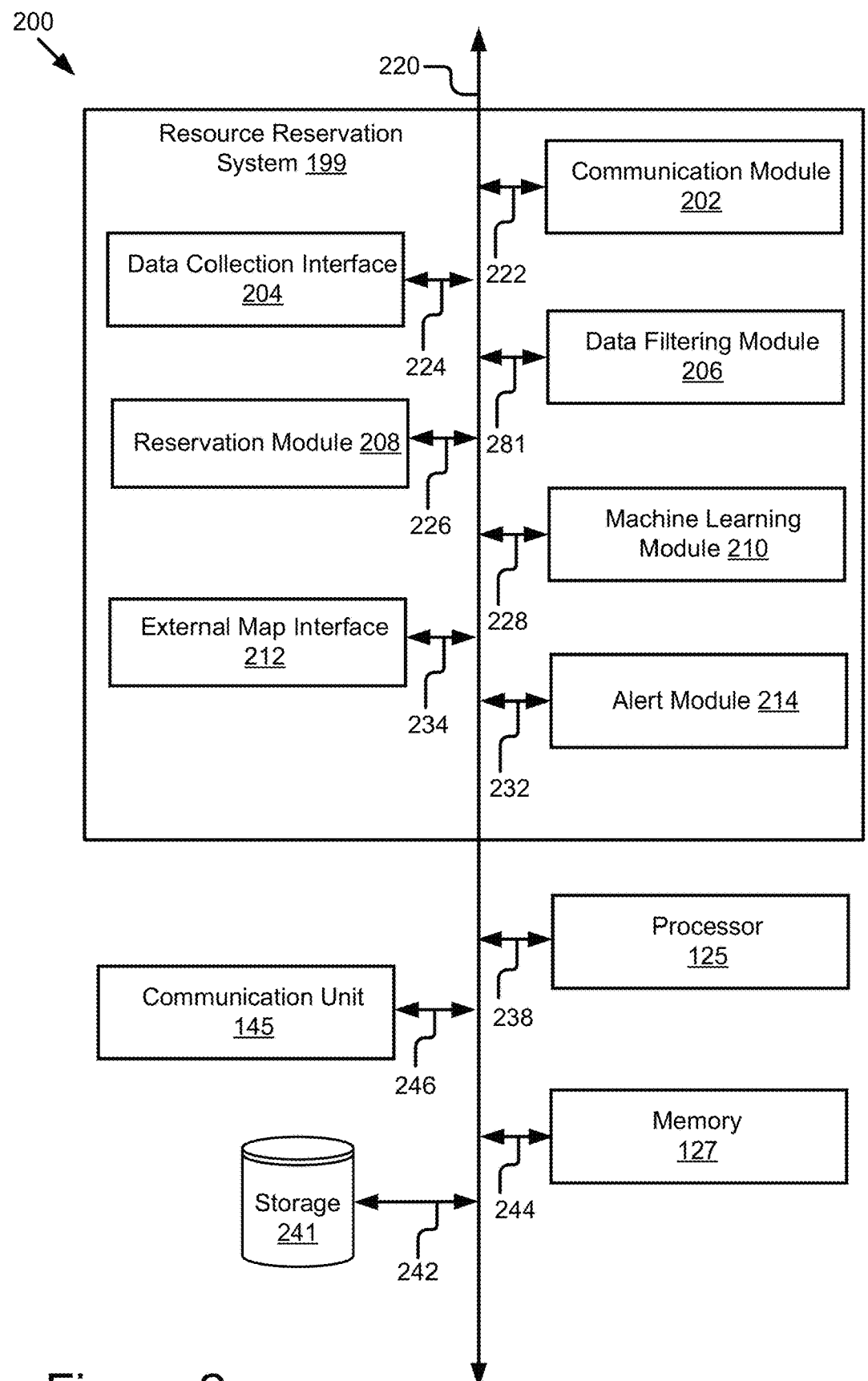
FIG. 2 is a block diagram illustrating an example computer system including a resource reservation system according to some embodiments.

Referring now to FIG. 2, depicted is a block diagram illustrating an example computer system 200 including the resource reservation system 199 according to some embodiments. In some embodiments, the computer system 200 may include a special-purpose computer system that is programmed to perform one or more steps of methods 400, 500 and 600 described below with reference to FIGS. 4-6.

In some embodiments, the computer system 200 may be an element of the cloud server 140. For example, the computer system 200 may be a processor-based computing device of the cloud server 140.

The computer system 200 may include one or more of the following elements according to some examples: the resource reservation system 199; the processor 125; the communication unit 145; the memory 127; and a storage 241. The components of the computer system 200 are communicatively coupled by a bus 220.

In the illustrated embodiment, the processor 125 is communicatively coupled to the bus 220 via a signal line 238. The communication unit 145 is communicatively coupled to the bus 220 via a signal line 246. The storage 241 is communicatively coupled to the bus 220 via a signal line 242. The memory 127 is communicatively coupled to the bus 220 via a signal line 244.

The following elements of the computer system 200 are described above with reference to FIG. 1A, and so, those descriptions will not be repeated here: the processor 125; the communication unit 145; and the memory 127.

The storage 241 can be a non-transitory storage medium that stores data for providing the functionality described herein. The storage 241 may be a dynamic random-access memory (DRAM) device, a static random-access memory (SRAM) device, flash memory, or some other memory devices. In some embodiments, the storage 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the illustrated embodiment shown in FIG. 2, the resource reservation system 199 includes: a communication module 202; a data collection interface 204; a data filtering module 206; a reservation module 208; a machine learning module 210; an external map interface 212; and an alert module 214. These components of the resource reservation system 199 are communicatively coupled to each other via the bus 220. In some embodiments, components of the resource reservation system 199 can be stored in a single server or device. In some other embodiments, components of the resource reservation system 199 can be distributed and stored across multiple servers or devices. For example, some of the components of the resource reservation system 199 may be distributed across the infrastructure device 115, the cloud server 140 and the vehicle 123.

The communication module 202 can be software including routines for handling communications between the resource reservation system 199 and other components of the computer system 200. In some embodiments, the communication module 202 can be stored in the memory 127 of the computer system 200 and can be accessible and executable by the processor 125. The communication module 202 may be adapted for cooperation and communication with the processor 125 and other components of the computer system 200 via a signal line 222.

The communication module 202 sends and receives data, via the communication unit 145, to and from one or more elements of the operating environment 100. For example, the communication module 202 receives, via the communication unit 145, infrastructure data from the infrastructure device 115 via the network 105. The communication module 202 may send or receive any of the data, requests or messages described above with reference to FIG. 1A via the communication unit 145.

In some embodiments, the communication module 202 receives data from components of the resource reservation system 199 and stores the data in one or more of the storage 241 and the memory 127. For example, the communication module 202 receives any of the data described above with reference to the memory 127 from the communication unit 145 (via the network 105, infrastructure data, feedback data, map data, etc.) and stores this data in the memory 127 (or temporarily in the storage 241 which may act as a buffer for the computer system 200).

In some embodiments, the communication module 202 may handle communications between components of the resource reservation system 199. For example, the communication module 202 may handle communications among the data collection interface 204, the data filtering module 206, the reservation module 208, the machine learning module 210, the external map interface 212 and the alert module 214. Any of these modules may cause the communication module 202 to communicate with the other elements of the computer system 200 or the operating environment 100 (via the communication unit 145). For example, the data collection interface 204 may use the communication module 202 to communicate with the memory 127 so that confidence data of the infrastructure data generated by the data collection interface 204 is stored in the memory 127.

The data collection interface 204 can be software including routines for collecting infrastructure data from various infrastructure devices. In some embodiments, the data collection interface 204 can be stored in the memory 127 of the computer system 200 and can be accessible and executable by the processor 125. The data collection interface 204 may be adapted for cooperation and communication with the processor 125 and other components of the computer system 200 via a signal line 224.

In some embodiments, the data collection interface 204 may retrieve infrastructure data from various infrastructure devices (e.g., including the infrastructure device 115 shown in FIG. 1A). The data collection interface 204 distinguishes an origin of the infrastructure data based on one or more of a confidence level of the infrastructure data and details in the infrastructure data.

For example, the data collection interface 204 collects multiple sets of infrastructure data from multiple data sources. The data collection interface 204 can accept different data formats including XML or JSON. A data source can be an OEM-owned or a third-party-owned infrastructure device. The data collection interface 204 distinguishes origins of the multiple sets of infrastructure data from different data sources according to a confidence level of each set of infrastructrue data and details of each set of infrastructure data. For example, a first set of infrastructrue data coming from an OEM-owned infrastructure device may be highly trusted containing many details so that the data collection interface 204 assigns a high confidence level to the first set of infrastructure data, while a second set of infrastructure data coming from a third-party-owned infrastructure device may be less trusted without sufficient details (e.g., due to a contract between the OEM and the third party) so that the data collection interface 204 assigns a lower confidence level to the second set of infrastructure data. In some embodiments, the data collection interface 204 uses a rule-based mechanism, a machine learning mechanism or some other suitable mechanisms to assign a confidence level to a corresponding set of infrastructure data.

The data filtering module 206 can be software including routines that, when executed by the processor 125, cause the processor 125 to filter infrastructure data received from one or more infrastructure devices. In some embodiments, the data filtering module 206 can be a set of instructions stored in the memory 127 of the computer system 200 and can be accessible and executable by the processor 125. The data filtering module 206 may be adapted for cooperation and communication with the processor 125 and other components of the computer system 200 via a signal line 281.

In some embodiments, the data filtering module 206 takes one or more filtering criteria as an input to identify relevant infrastructure data for resource reservation. For example, a filtering criterion may specify a specific region where an infrastructure resource needs to be reserved; a filtering criterion may specify a particular highway or GPS position of an area of interest. In a further example, a filtering criterion may specify a time period (e.g., a range of dates, a time of day, a day of week, etc.) during which the infrastructure resource needs to be reserved. A user may also selectively specify one or more types of infrastructure resources to be reserved such as a memory size, a CPU processing capacity, and a bandwidth, etc.

In some embodiments, the infrastructure data can be data from a single infrastructure device or multiple infrastructure devices. The data filtering module 206 is operable to filter the infrastructure data based on one or more filtering criteria to generate filtered data as an output. The filtered data satisfies the one or more filtering criteria. For example, assume that a filtering criterion specifies a highway of interest. Based on this filtering criterion, the data filtering module 206 filters the infrastructure data to generate filtered data, where the filtered data includes a subset of the infrastructure data that is originated from infrastructure devices on the highway of interest. The data filtering module 206 forwards the filtered data to the reservation module 208.

The reservation module 208 can be software including routines that, when executed by the processor 125, cause the processor 125 to create a reservation result for reserving an infrastructure resource on one or more infrastructure devices 115. In some embodiments, the reservation module 208 can be stored in the memory 127 of the computer system 200 and can be accessible and executable by the processor 125. The reservation module 208 may be adapted for cooperation and communication with the processor 125 and other components of the computer system 200 via a signal line 226.

In some embodiments, the one or more reservation criteria may specify one or more of the following elements: a minimum amount and a maximum amount of an infrastructure resource (e.g., a computing resource) to be reserved; one or more types of V2I applications allowed during a scheduled time (e.g., during a certain day or a certain day of time); a number of requests of a particular V2I1 application and so on. The one or more reservation criteria can be defined by a user.

In some embodiments, the reservation module 208 creates a reservation result based on the filtered data and the one or more reservation criteria. The reservation result describes a reservation of an infrastructure resource on one or more infrastructure devices 115 for providing a V2I service. For example, the reservation module 208 creates the reservation result at least by: comparing the filtered data with the one or more reservation criteria to determine an amount of the infrastructure resource to be additionally allocated or deallocated (e.g., an additional amount of the infrastructure resource to be allocated or an excessive amount of the infrastructure resource to be deallocated); and generating the reservation result that allocates or deallocates the amount of the infrastructure resource on a scheduled time (e.g., allocating the additional amount of the infrastructure resource or deallocating the excessive amount of the infrastructure resource on the scheduled time).

In another example, the reservation module 208 compares the one or more criteria with a current usage of the infrastructure resource described by the filtered data, and then generates the reservation result that automatically allocates more of the infrastructure resource or less of the infrastructure resource based on the one or more reservation criteria.

In some embodiments, the reservation module 208 reads the filtered data from the data filtering module 206 and compares the filtered data to the one or more reservation criteria to determine an amount of the infrastructure resource to be additionally allocated or deallocated. After calculating the amount of the infrastructure resource, the reservation module 208 communicates with the one or more infrastructure devices 115 whose infrastructure resource is to be reserved over the network 105 to finalize a resource reservation process. The reserved infrastructure resource on the one or more infrastructure devices becomes activated according to the one or more reservation criteria. For example, if a reservation criterion specifies that 100 MB memory is to be additionally allocated on a scheduled time (e.g., from 12:00 pm to 1:00 pm), the one or more infrastructure devices 115 keep this information in advance and then perform memory allocation according to the scheduled time.

In some embodiments, the reservation module 208 superimposes the reservation result on a base map imported from the map provider 110, so that the reservation result is visualized on the base map. For example, a user can visualize a current usage of the infrastructure resource and a reserved usage of the infrastructure resource together on the base map. In some embodiments, the reservation result can be modified by a user via a visualization on the base map.

The machine learning module 210 can be software including routines that, when executed by the processor 125, cause the processor 125 to analyze feedback data describing an execution status of the reserved infrastructure resource. In some embodiments, the machine learning module 210 can be stored in the memory 127 of the computer system 200 and can be accessible and executable by the processor 125. The machine learning module 210 may be adapted for cooperation and communication with the processor 125 and other components of the computer system 200 via a signal line 228.

In some embodiments, the machine learning module 210 modifies, based on the feedback data, the one or more reservation criteria that are used to create the reservation result. For example, the machine learning module 210 receives the feedback data from the infrastructure device 115, analyzes the feedback data to generate an analysis result, and modifies the one or more reservation criteria based on the analysis result. Then, the machine learning module 210 modifies the reservation result based on the one or more modified reservation criteria so that a shortage or an excess of the infrastructure resource for execution of the V2I service is avoided. For example, the avoidance of the shortage or the excess improves over time as more feedback data is received. An example of modifying the reservation result based on the feedback data is described below.

In some embodiments, the machine learning module 210 utilizes one or more machine learning techniques (e.g., a deep learning technique, a neural network, etc.) to analyze the feedback data.

In some embodiments, the machine learning module 210 utilizes a learning algorithm to build the feedback data into a learning database so that performance of the resource reservation system 199 on avoiding shortages or excesses of infrastructure resources improves as the learning database stores more and more feedback data. For example, the machine learning module 210 can build an item of the learning database to include the feedback data, the one or more modified reservation criteria and the modified reservation result. As more and more feedback data is received, more and more items of the learning database can be built. Then, the items in the learning database can be used as training data for training the one or more machine learning techniques used to analyze feedback data.

In some embodiments, the machine learning module 210 monitors a status of the infrastructure resource of the infrastructure device 115 and updates the reservation result based on the status of the infrastructure resource in real time to improve allocation efficiency of the infrastructure resource. For example, assume that the infrastructure device 115 has multiple memories 127 and the reserved infrastructure resource is "memory." If the status of the "memory" resource indicates that one of the memories 127 malfunctions, the reservation result may be updated in real time to reduce the memory usage. After a period of time, if the status of the "memory" resource indicates that the previously-malfunctioned memory is restored and available now, the reservation result may be updated in real time to increase the memory usage.

The external map interface 212 can be software including routines that, when executed by the processor 125, cause the processor 125 to retrieve map data describing a base map. In some embodiments, the external map interface 212 can be stored in the memory 127 of the computer system 200 and can be accessible and executable by the processor 125. The external map interface 212 may be adapted for cooperation and communication with the processor 125 and other components of the computer system 200 via a signal line 234.

In some embodiments, the external map interface 212 imports a base map from the map provider 110. For example, the external map interface 212 imports the base map from the map provider 110 via open APIs, and then the reservation result can be visually displayed associated with a particular geographical area shown in the base map.

The alert module 214 can be software including routines that, when executed by the processor 125, cause the processor 125 to generate an alert message responsive to occurrence of an alert triggering event. In some embodiments, the alert module 214 can be stored in the memory 127 of the computer system 200 and can be accessible and executable by the processor 125. The alert module 214 may be adapted for cooperation and communication with the processor 125 and other components of the computer system 200 via a signal line 232.

In some embodiments, the alert module 214 detects an occurrence of an alert triggering event associated with the infrastructure resource and generates an alert message responsive to the occurrence of the alert triggering event. The alert triggering event includes, for example, an event indicating a violation of a usage of the infrastructure resource on the infrastructure device 115 or an event describing that the usage of the infrastructure resource reaches an alert threshold.

In some embodiments, the alert module 214 takes the alert setting data as an input to specify a condition to trigger an alert message in case of a shortage or an excess of the infrastructure resource. For example, a user may specify an alert threshold of the memory utilization (e.g., 95%). If the filtered data generated by the data filtering module 206 shows that the current memory usage exceeds the alert threshold, the alert module 214 provides an alert message to highlight one or more affected infrastructure devices (e.g., highlighting the affected infrastructure devices with different colors, increasing a size of a visual image, showing a log message on top, etc., on the base map).

An example of a reservation of requests for two V2I applications (e.g., a map application and a ride share application) is described here. Assume that a filtering criterion specifies that: (1) an infrastructure resource of interest is "requests" from the V2I applications (e.g., a total number of requests allowed for the map application and a total number of requests allowed for the ride share application); (2) a target infrastructure device of interest is a particular roadside unit; and (3) a time period of interest is 7:00 am to 9:00 am, Monday.

On Monday 6:30 am, the data collection interface 204 may collect infrastructure data from the roadside unit. The infrastructure data may include data describing a memory usage, a usage of computation power, and a total number of requests for each V2I application on the roadside unit. The data filtering module 206 filters the infrastructure data based on the filtering criterion to generate filtered data describing that: (1) a total number of requests for the map application is "350" at 6:30 am; and (2) a total number of requests for the ride share application is "300" at 6:30 am.

Assume that a reservation criterion specifies: (1) allowing the map application to have 400 requests; and (2) the ride share application to have 320 requests during 7:00 am to 9:00 am on Monday. Thus, the reservation module 208 generates a reservation result describing that: (1) an additional amount of "400-350=50" requests are allocated to the map application at 7:00 am so that a total of 400 requests are allocated for the map application during 7:00 am to 9:00 am on Monday; and (2) an additional amount of "320-300=20" requests are allocated to the ride share application at 7:00 am so that a total of 320 requests are allocated for the ride share application during 7:00 am to 9:00 am on Monday.

Next, the reservation result is executed on the roadside unit on the scheduled time beginning at 7:00 am. An execution status of the infrastructure resource on the roadside unit is monitored, which indicates that: (1) the requests for the map application at 8:00 am already occupy a 99% usage of the 400 requests (400*99%=396 requests); and (2) the requests for the ride share application at 8:00 am only occupy a 20% usage of the 320 requests (320*20%=64 requests). It appears that there are not enough requests allocated for the map application but too many requests allocated for the ride share application. This can happen, for example, under abnormal weather conditions or abnormally heavy traffic when more vehicles access the map application for navigation instructions and less vehicles access the ride share application for providing a ride share service.

Then, the machine learning module 210 receives feedback data describing the execution status of the infrastructure resource on the roadside unit. Based on the feedback data, the machine learning module 210 updates the reservation criterion as: (1) allowing the map application to have 600 requests during 8:00 am to 9:00 am on Monday; and (2) the ride share application to have 120 requests during 8:00 am to 9:00 am on Monday. That is, the total number of requests allocated for the map application is increased while the total number of requests allocated for the ride share application is reduced. Then, the reservation result can be updated with: (1) an additional amount of "600-400=200" requests to be allocated to the map application during 8:00 am to 9:00 am so that a total of 600 requests are allocated for the map application during 8:00 am to 9:00 am on Monday; and (2) an amount of "320-120=200" requests to be deallocated from the ride share application during 8:00 am to 9:00 am so that a total of 120 requests are allocated for the ride share application during 8:00 am to 9:00 am on Monday. As a result, the infrastructure resource can be allocated more efficiently.

Example Processes

Figure 3:
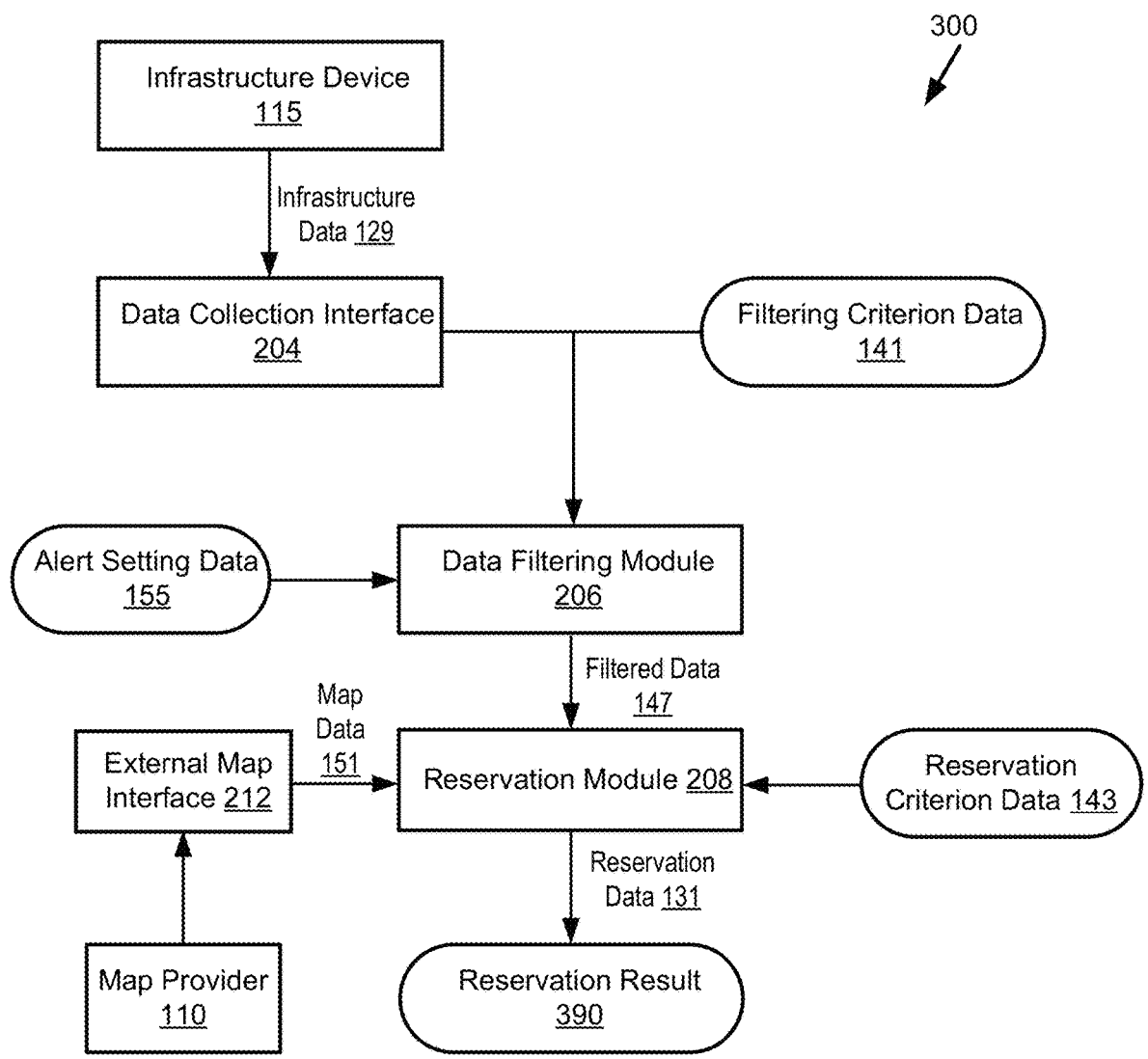
FIG. 3 depicts a flow process for automatically reserving an infrastructure resource for providing a V2I service according to some embodiments.

Referring now to FIG. 3, depicted is a flow process 300 for automatically reserving an infrastructure resource for providing a V2I service according to some embodiments. The flow process 300 can be executed on the cloud server 140.

Figure 9:
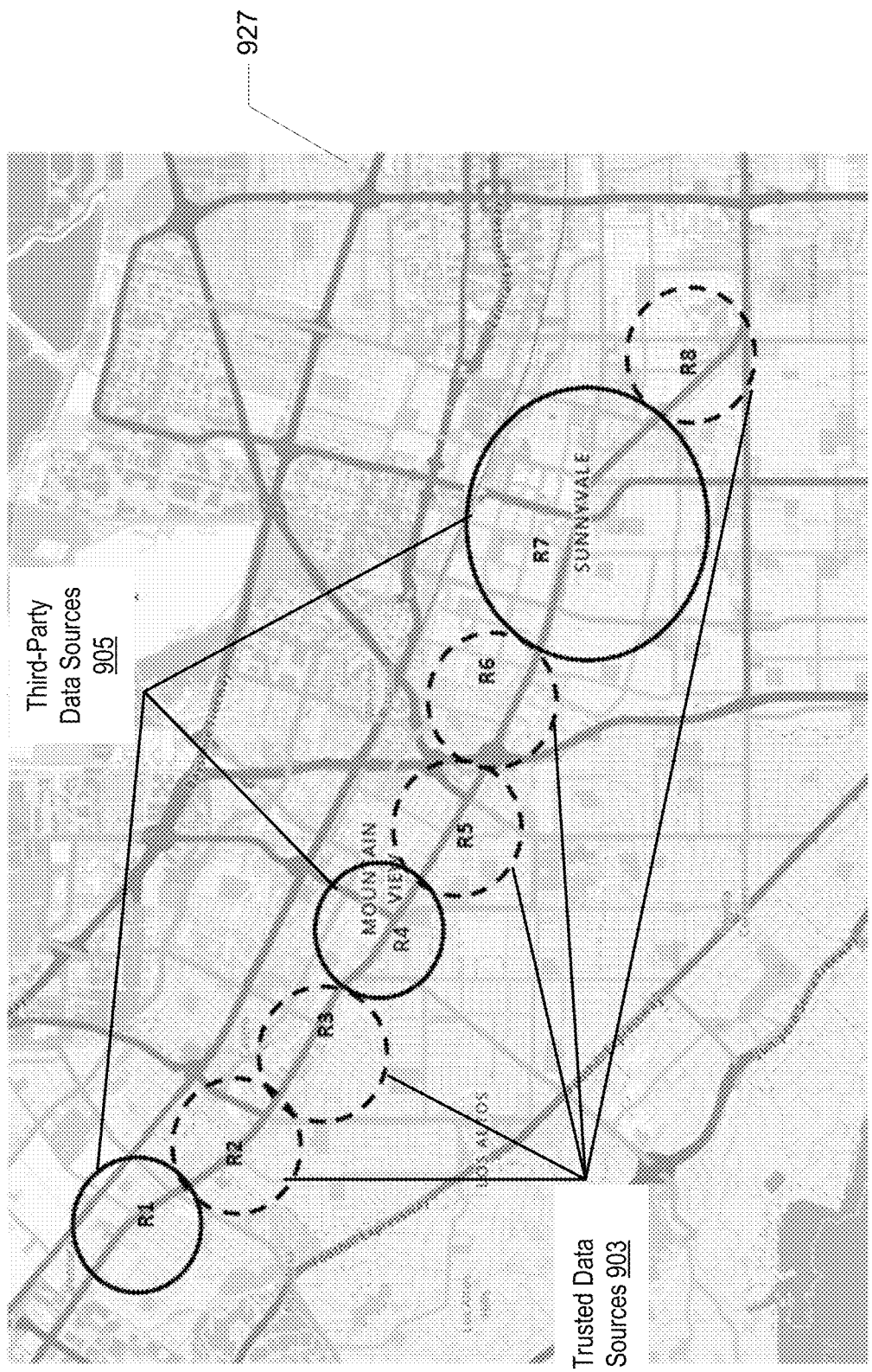
FIG. 9 is a graphical representation illustrating Quality-of-Service (QoS) levels of various sets of infrastructure data from different infrastructure devices according to some embodiments.

The data collection interface 204 retrieves the infrastructure data 129 (e.g., log data) stored in the infrastructure device 115 over a wired or wireless network. Then, the data collection interface 204 identifies an origin of the infrastructure data with a confidence level. For example, the origin of the infrastructure data can be the infrastructure device 115 that generates the infrastructure data 129, and the data collection interface 204 can identify the origin of the infrastructure data 129 as an identifier (ID) of the infrastructure device 115. Then, the retrieved infrastructure data 129 is stored in a local or remote database of the cloud server 140. This confidence level is used to visualize whether an origin of the infrastructure data is a trusted data source or a third-party data source as illustrated in FIG. 9, which is described below in more detail.

A user may define filtering criteria by: selecting a date/time to visualize a reservation; a region category to visualize the reservation such as a road type or GPS region; a region (e.g., Highway 101 or a GPS region with top left: (37°24'29.2"N, 122°04'20.9"W) and bottom right: (37°19'16.2"N, 121°55'51.7"W); and a resource type to reserve such as memory or computation power, etc. The filtering criteria are described by the filtering criterion data 141.

The data filtering module 206 filters the infrastructure data 129 using the filtering criteria to generate the filtered data 147. In some embodiments, the data filtering module 206 causes the alert module 214 shown in FIG. 2 to retrieve the alert setting data 155. The alert module 214 determines whether an alert triggering event associated with the infrastructure resource to be reserved occurs based on the alert setting data 155. If an alert triggering event occurs, the alert module 214 generates an alert message responsive to the occurrence of the alert triggering event.

The reservation module 208 retrieves reservation criterion data 143 that describes one or more reservation criteria. The reservation module 208 generates a reservation result 390 based on the one or more reservation criteria and the filtered data 147. The reservation result 390 is described by the reservation data 131. In some embodiments, the external map interface 212 retrieves map data 151 describing a base map from the map provider 110 and forwards the map data 151 to the reservation module 208, causing the reservation module 208 to superimpose the reservation result 390 on the base map.

Figure 4:
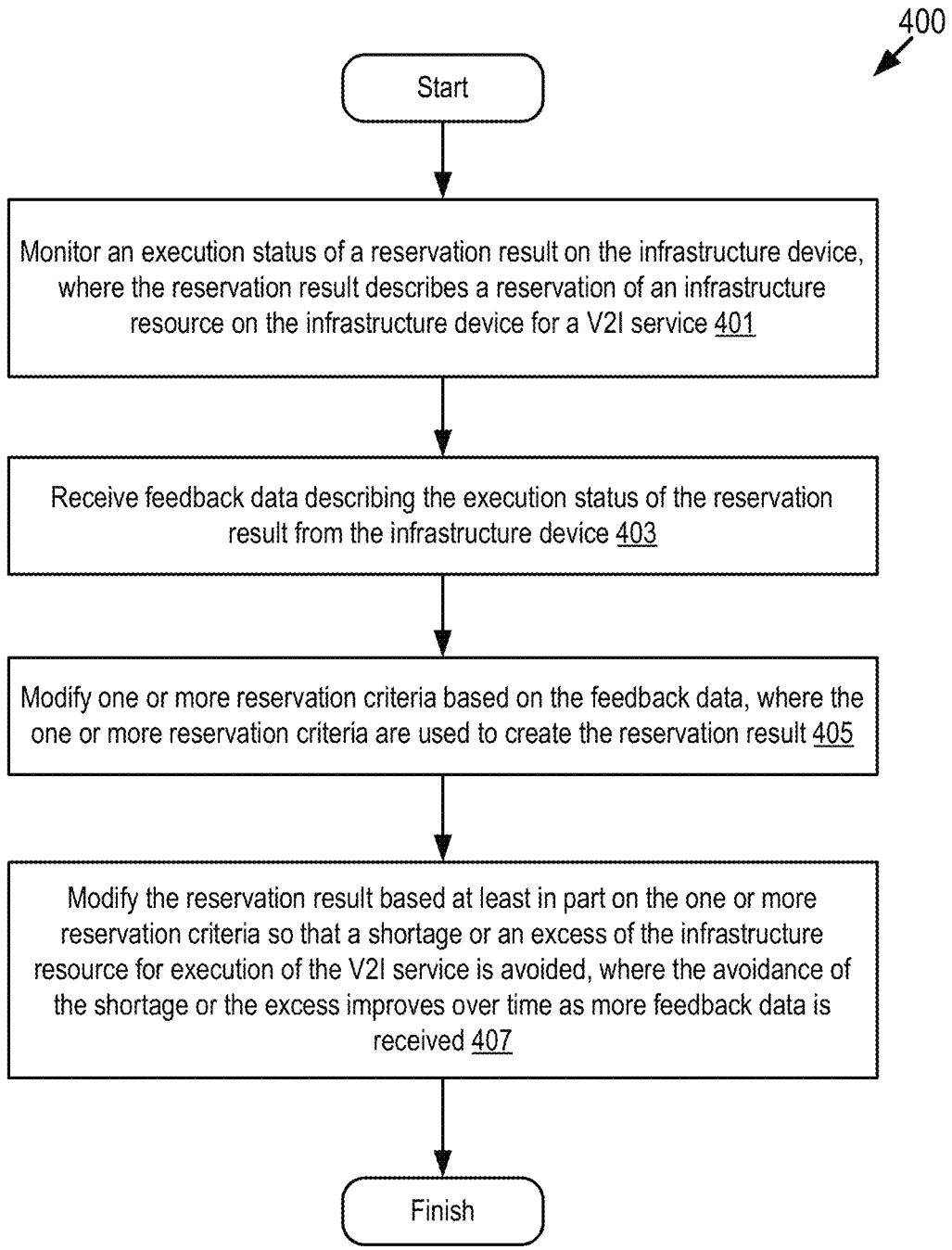
FIG. 4 depicts a method for automatically reserving an infrastructure resource for providing a V2I service according to some embodiments.

Referring now to FIG. 4, depicted is a flowchart of an example method 400 for automatically reserving an infrastructure resource for providing a V2I service according to some embodiments. The steps of the method 400 are executable in any order, and not necessarily the order depicted in FIG. 4.

At step 401, the machine learning module 210 monitors an execution status of a reservation result on the infrastructure device 115. For example, the reservation result describes a reservation of an infrastructure resource on the infrastructure device 115 for providing a V2I service.

At step 403, the machine learning module 210 receives feedback data describing the execution status of the reservation result from the infrastructure device 115.

At step 405, the machine learning module 210 modifies one or more reservation criteria based on the feedback data, where the one or more reservation criteria are used to create the reservation result.

At step 407, the machine learning module 210 modifies the reservation result based at least in part on the one or more reservation criteria so that a shortage or an excess of the infrastructure resource for execution of the V2I service is avoided. For example, the avoidance of the shortage or the excess improves over time as more feedback data is received.

Figure 5A:
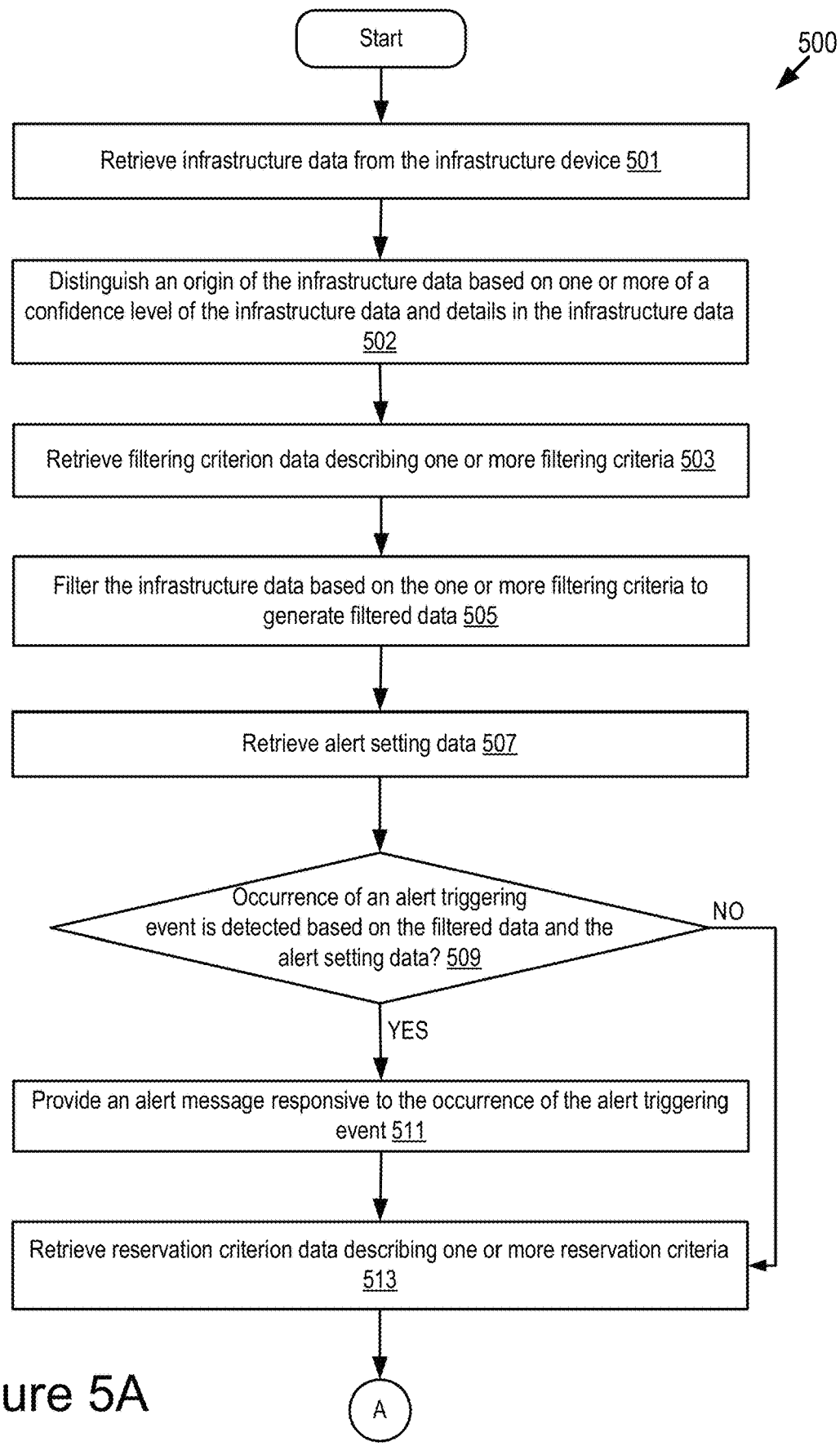
FIGS. 5A-5B depict another method for automatically reserving an infrastructure resource for providing a V2I service according to some embodiments.
Figure 5B:
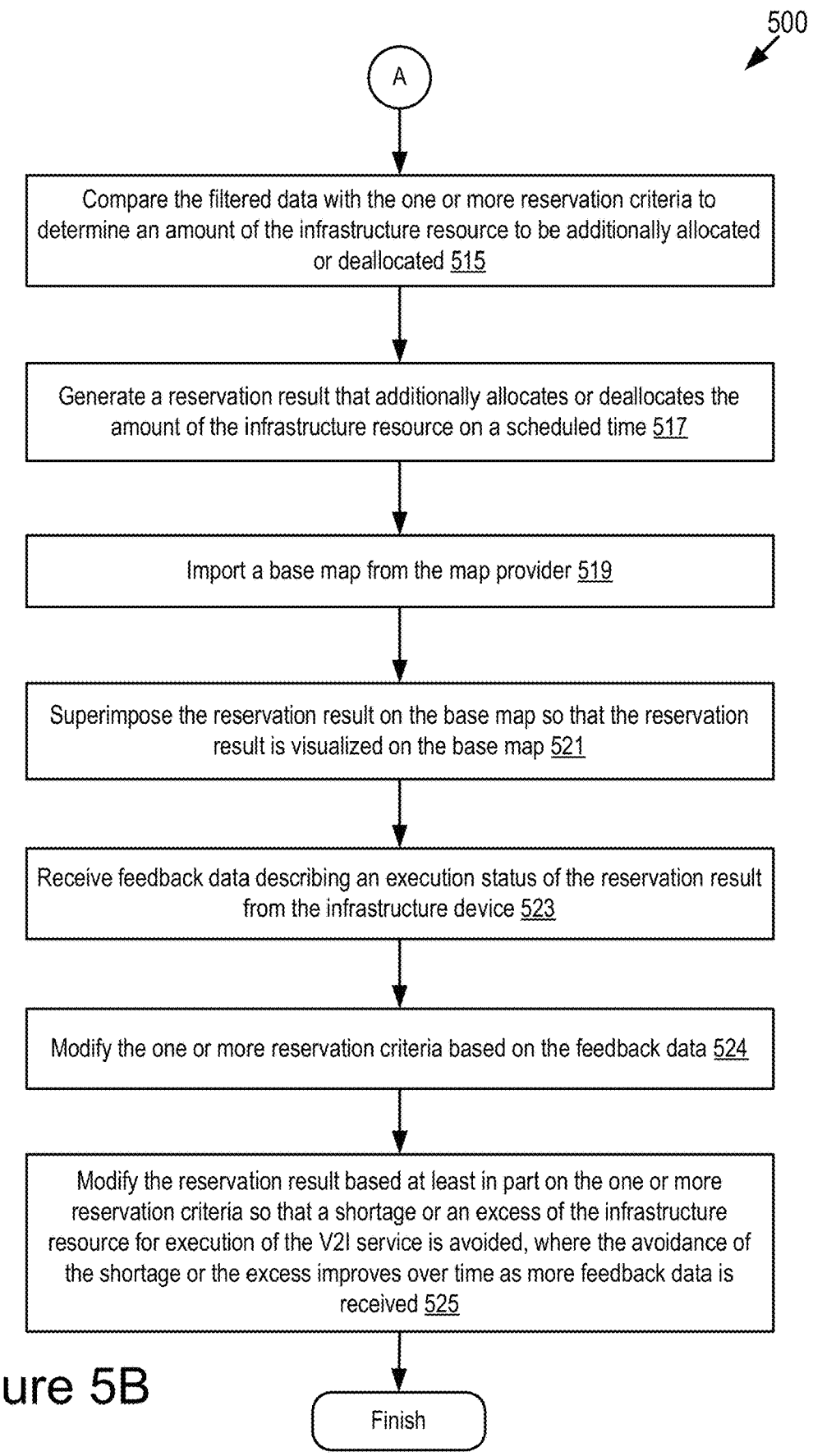

FIGS. 5A-5B depict another method 500 for automatically reserving an infrastructure resource for providing a V2I service according to some embodiments. The steps of the method 500 are executable in any order, and not necessarily the order depicted in FIGS. 5A-5B.

Referring to FIG. 5A, at step 501, the data collection interface 204 retrieves infrastructure data from the infrastructure device 115.

At step 502, the data collection module 204 distinguishes an origin of the infrastructure data based on one or more of a confidence level of the infrastructure data and details in the infrastructure data.

At step 503, the data filtering module 206 retrieves filtering criterion data describing one or more filtering criteria.

At step 505, the data filtering module 206 filters the infrastructure data based on the one or more filtering criteria to generate filtered data.

At step 507, the alert module 214 retrieves alert setting data.

At step 509, the alert module 214 determines whether occurrence of an alert triggering event is detected based on the filtered data and the alert setting data. Responsive to the occurrence of the alert triggering event, the method 500 proceeds to step 511. Otherwise, the method 500 proceeds to step 513.

At step 511, the alert module 214 provides an alert message responsive to the occurrence of the alert triggering event.

At step 513, the reservation module 208 retrieves reservation criterion data describing one or more reservation criteria.

Referring to FIG. 5B, at step 515, the reservation module 208 compares the filtered data with the one or more reservation criteria to determine an amount of the infrastructure resource to be additionally allocated or deallocated (e.g., an additional amount of the infrastructure resource to be allocated or an excessive amount of the infrastructure resource to be deallocated).

At step 517, the reservation module 208 generates a reservation result that additionally allocates or deallocates the amount of the infrastructure resource on a scheduled time. For example, the reservation result describes allocating the additional amount of the infrastructure resource or deallocating the excessive amount of the infrastructure resource on a scheduled time.

At step 519, the external map interface 212 imports a base map from the map provider 110.

At step 521, the reservation module 208 superimposes the reservation result on the base map so that the reservation result is visualized on the base map.

At step 523, the machine learning module 210 receives feedback data describing an execution status of the reservation result from the infrastructure device 115 responsive to the reservation result being executed on the scheduled time.

At step 524, the machine learning module 210 modifies the one or more reservation criteria based on the feedback data, where the one or more reservation criteria are used to create the reservation result.

At step 525, the machine learning module 210 modifies the reservation result based at least in part on the one or more modified reservation criteria so that a shortage or an excess of the infrastructure resource for execution of the V2I service is avoided. For example, the avoidance of the shortage or the excess improves over time as more feedback data is received.

Figure 6:
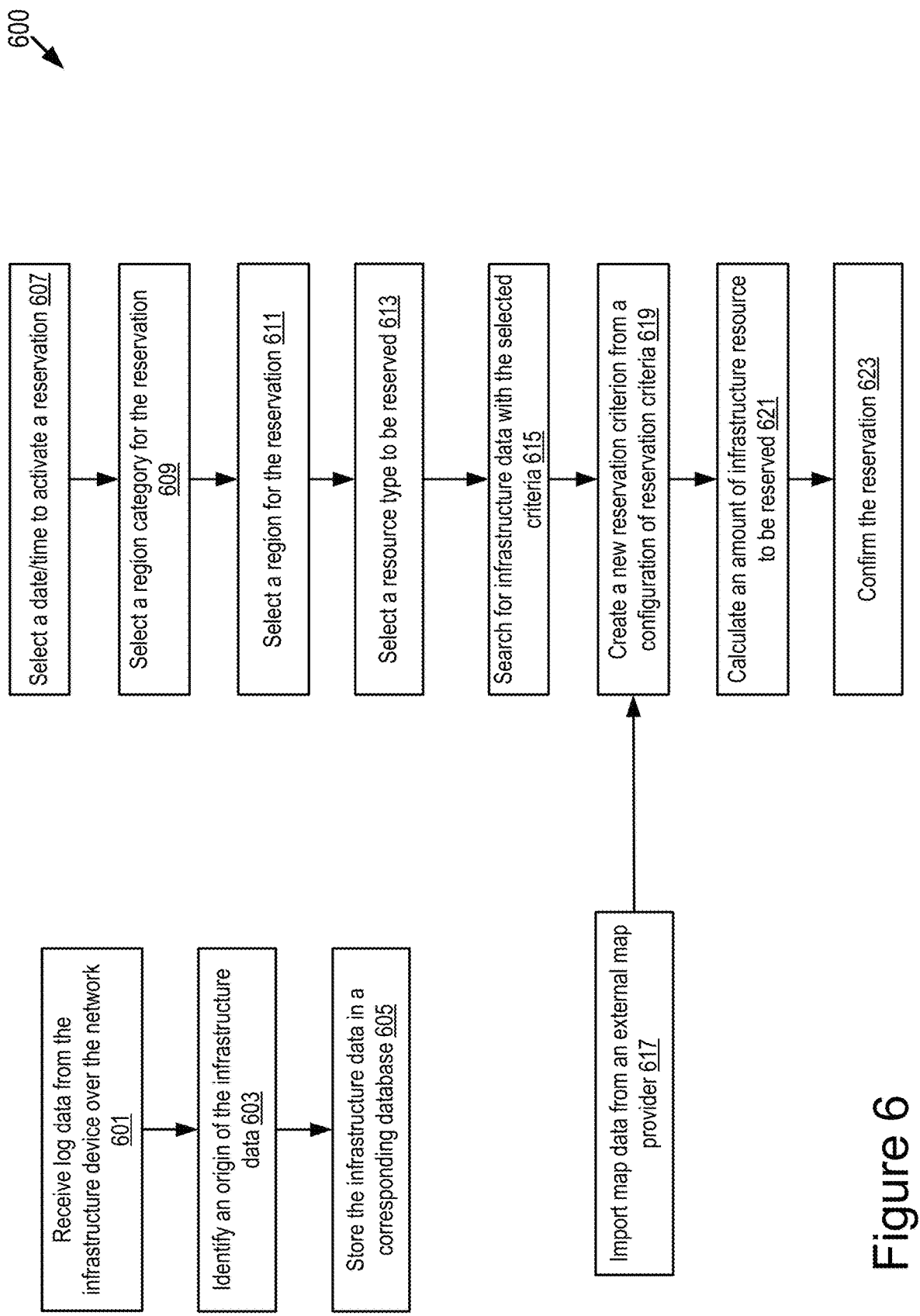
FIG. 6 depicts yet another method for automatically reserving an infrastructure resource for providing a V2I service according to some embodiments.

FIG. 6 depicts yet another method 600 for automatically reserving an infrastructure resource for providing a V2I service according to some embodiments. The steps of the method 600 are executable in any order, and not necessarily the order depicted in FIG. 6.

At step 601, the data collection interface 204 retrieves the infrastructure data (e.g., log data) from the infrastructure device 115 over a wired or wireless network (e.g., the network 105). Then, at step 603, the data collection interface 204 identifies an origin of the infrastructure data with a confidence level. At step 605, the data collection module 204 stores the infrastructure data in a corresponding database of the cloud server 140.

The filtering criteria can be defined by: at step 607, allowing a user to select a date/time to activate a reservation; at step 609, allowing the user to select a region category for the reservation; at step 611, allowing the user to select a region of interest for the reservation; and at step 613, allowing the user to select a resource type to be reserved such as memory or computation power, etc.

At step 615, the data filtering module 206 searches for infrastructure data with the selected criteria to output filtered data. The filtered data includes infrastructure data that satisfies the selected criteria.

At step 617, the external map interface 212 imports map data describing a base map from an external map provider. The external map interface 212 forwards the map data to the reservation module 208.

At step 619, the reservation module 208 creates a new reservation criterion from a configuration of reservation criteria.

At step 621, the reservation module 208 calculates an amount of the infrastructure resource to be reserved based on the new reservation criterion and the filtered data.

At step 623, the reservation module 208 confirms the reservation of the infrastructure resource. For example, the reservation module 208 superimposes a reservation result describing the amount of the infrastructure resource to be reserved on the base map to generate a reservation-visualization map. The reservation module 208 presents the reservation-visualization map to the user, so that the user can confirm, modify, or delete the reservation result on the reservation-visualization map.

Figure 7A:
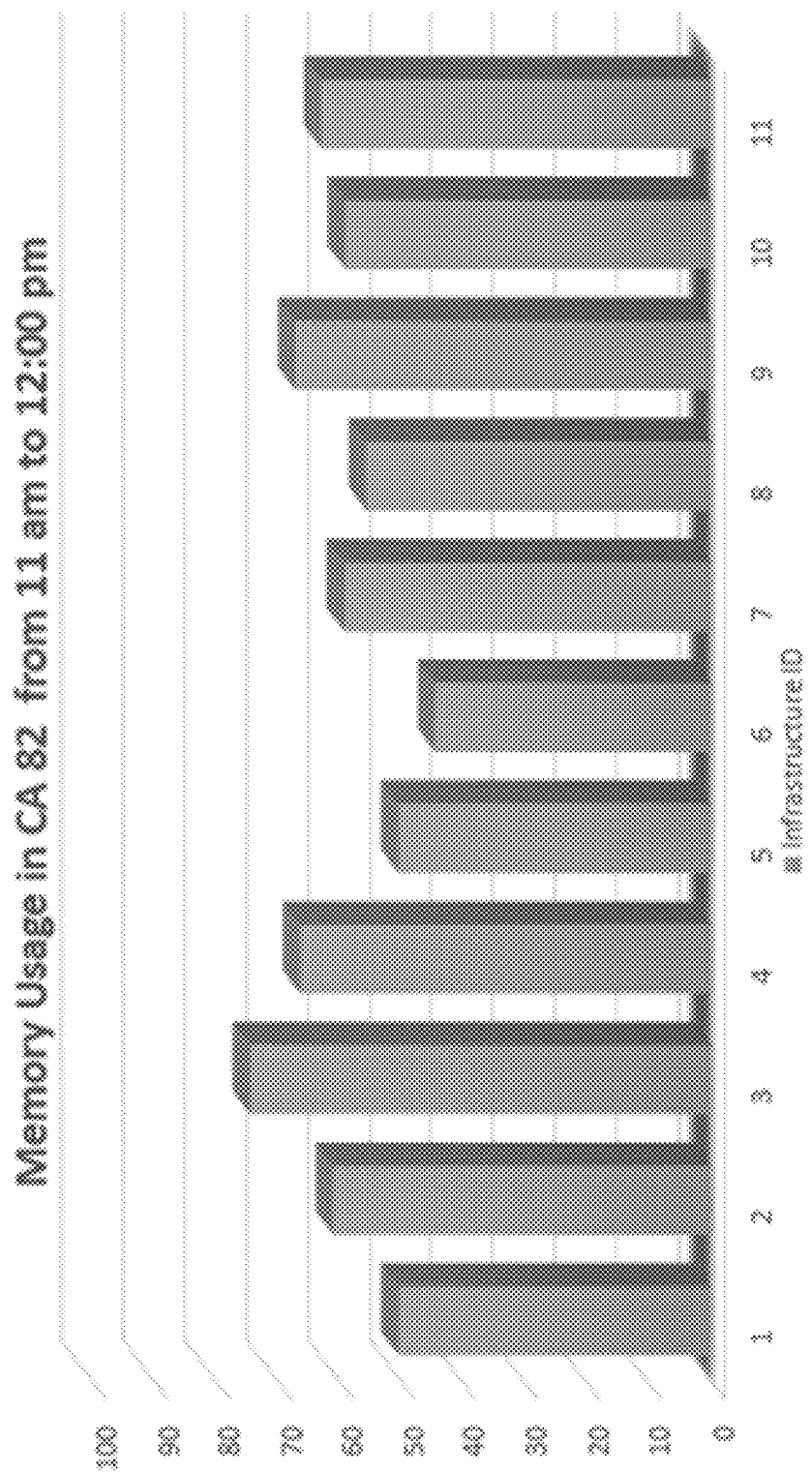
FIG. 7A is a graphical representation illustrating an example reservation result describing memory usages of different infrastructure devices on a highway according to some embodiments.

FIG. 7A is a graphical representation illustrating an example reservation result describing memory usages on different infrastructure devices along a highway according to some embodiments. For example, the reservation result in FIG. 7A depicts memory usages in a highway "CA 82" from 11:00 am to 12:00 pm for eleven infrastructure devices with infrastructure IDs 1-11. The reservation result can be, for example, a configuration of a maximum memory utilization for each of the eleven infrastructure devices.

Figure 7B:
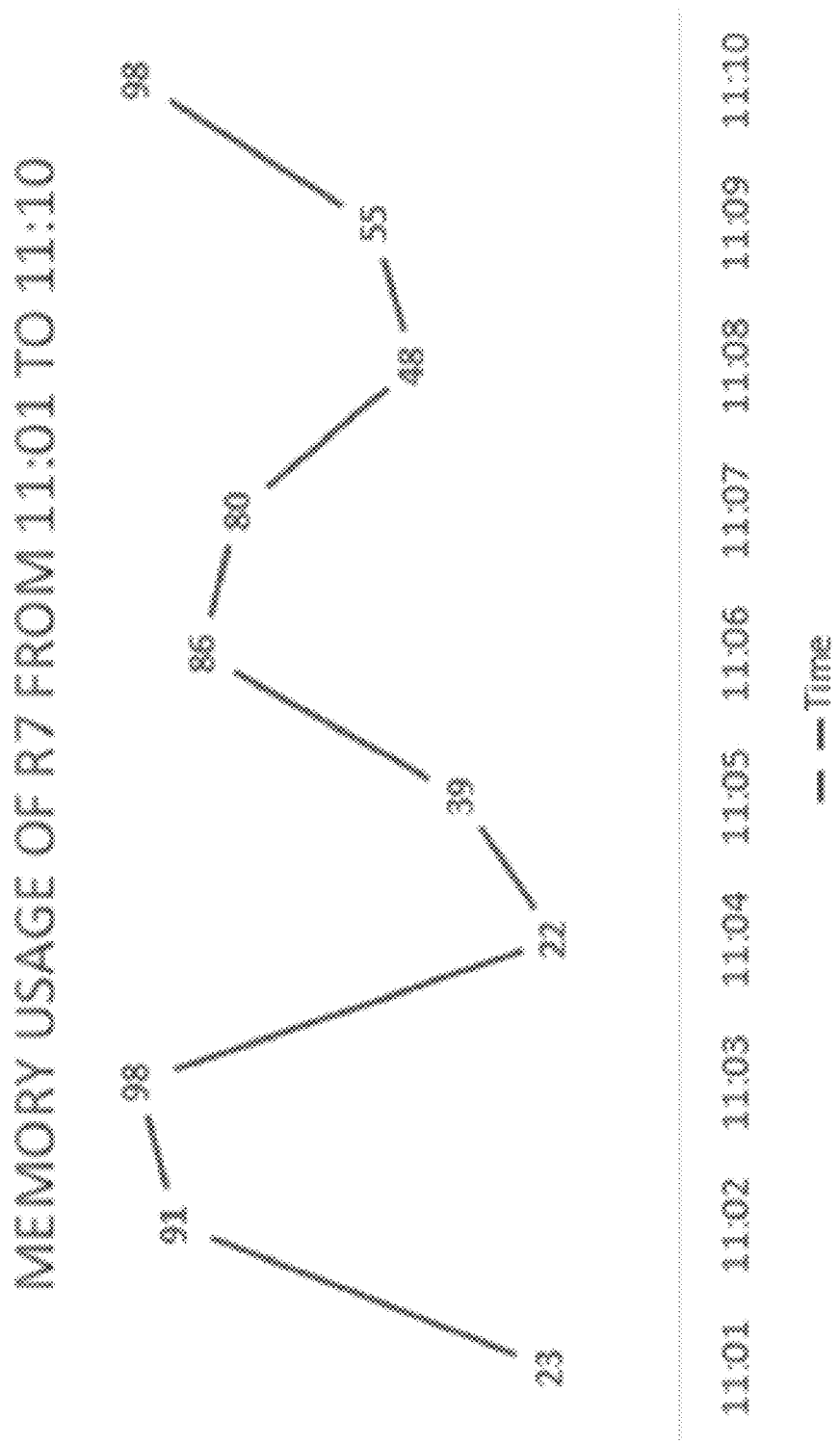
FIG. 7B is a graphical representation illustrating an example reservation result describing a memory usage of an infrastructure device according to some embodiments.

FIG. 7B is a graphical representation illustrating an example reservation result describing a memory usage on an infrastructure device (with an infrastructure ID "R7") according to some embodiments. For example, the reservation result in FIG. 7B depicts a memory usage of the infrastructure device "R7" at a time period from 11:01 am to 11:10 am. The reservation result can be, for example, a configuration of a maximum memory utilization for the infrastructure device "R7" during the specified time period.

Figure 8A:
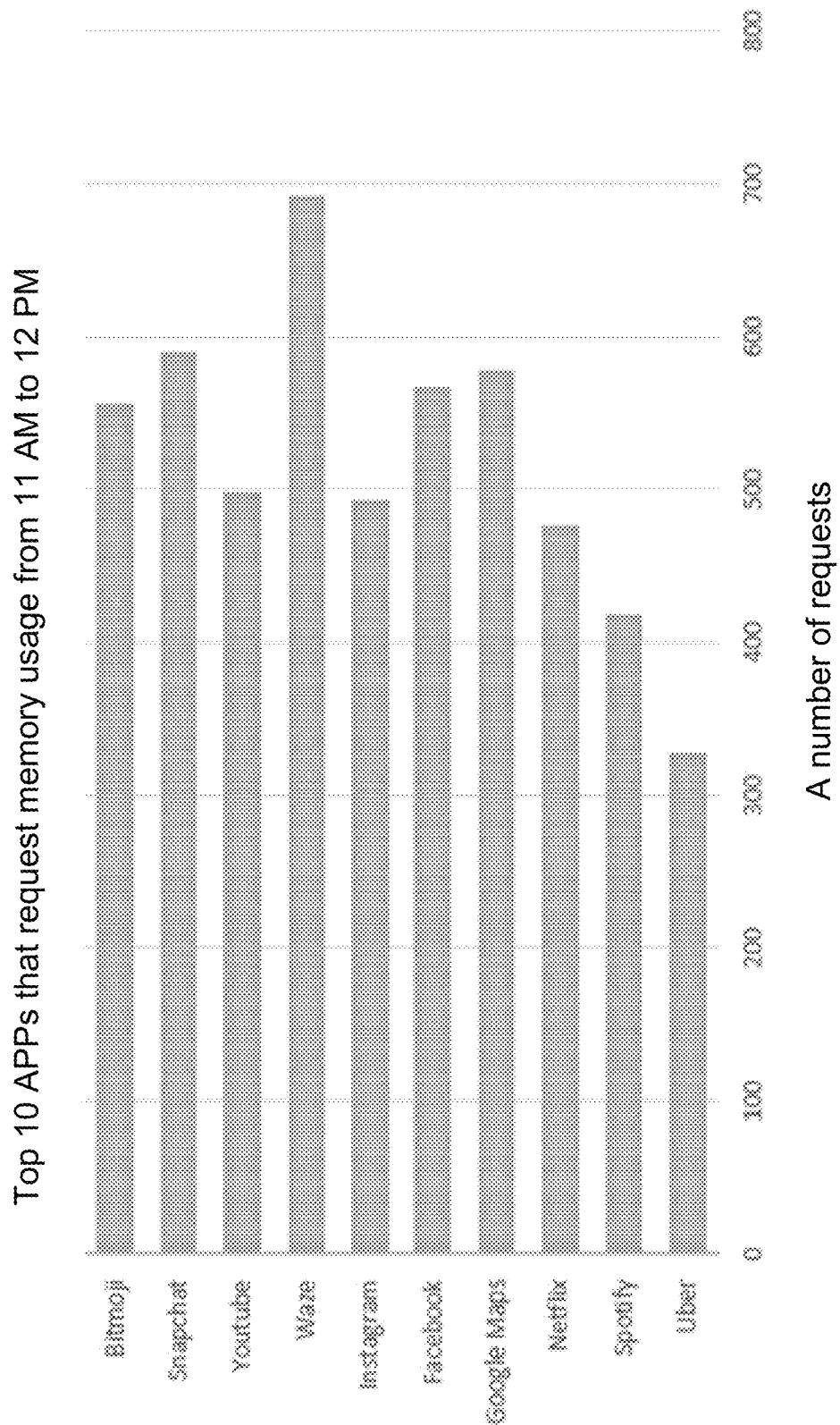
FIG. 8A is a graphical representation illustrating an example reservation result describing types of top ten V2I applications on an infrastructure device according to some embodiments.

FIG. 8A is a graphical representation illustrating an example reservation result describing types of top ten V2I applications on an infrastructure device according to some embodiments. For example, each of the top ten V2I1 applications requests a memory usage during a certain timeslot (e.g., from 11:00 am to 12:00 pm). The reservation result in FIG. 8A shows a configuration of a maximum number of application requests for each of the top ten V2I applications on a single infrastructure device.

Figure 8B:
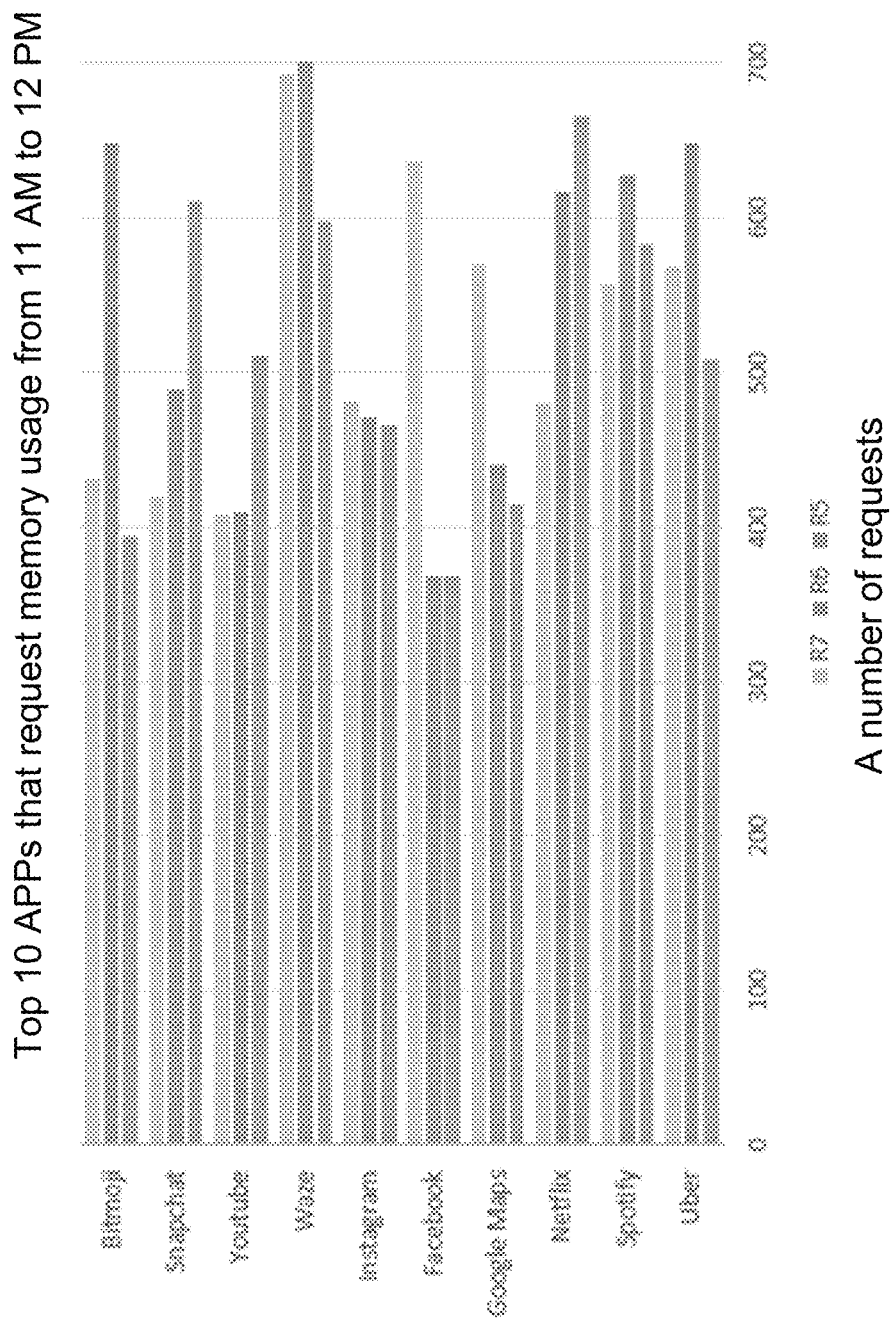
FIG. 8B is a graphical representation illustrating an example reservation result describing types of top ten V2I applications on various infrastructure devices according to some embodiments.

FIG. 8B is a graphical representation illustrating an example reservation result describing types of top ten V2I applications on various infrastructure devices according to some embodiments. For example, each of the top ten V2I applications requests a memory usage during a certain timeslot (e.g., from 11:00 am to 12:00 pm). The reservation result in FIG. 8B shows a configuration of a maximum number of application requests for each of the top ten V2I applications on three infrastructure devices "R5," "R6" and "R7."

FIG. 9 is a graphical representation illustrating Quality-of-Service (QoS) levels of various sets of infrastructure data from different infrastructure devices according to some embodiments. FIG. 9 illustrates eight infrastructure devices R1-R8 on a base map 927. Each infrastructure device is surrounded by a circle to indicate a coverage area of the corresponding infrastructure device. The infrastructure devices R2, R3, R5, R6 and R8 each of which is surrounded with a dashed line circle are trusted data sources 903, and the infrastructure devices R1, R4 and R7 each of which is surrounded with a solid line circle are third-party data sources 905. For example, the infrastructure devices R2, R3, R5, R6 and R8 are OEM-controlled infrastructure devices whose infrastructure data is assigned with a high confidence level, and the infrastructure devices R1, R4 and R7 are third-party controlled infrastructure devices whose infrastructure data is assigned with a low confidence level.

Figure 10A:
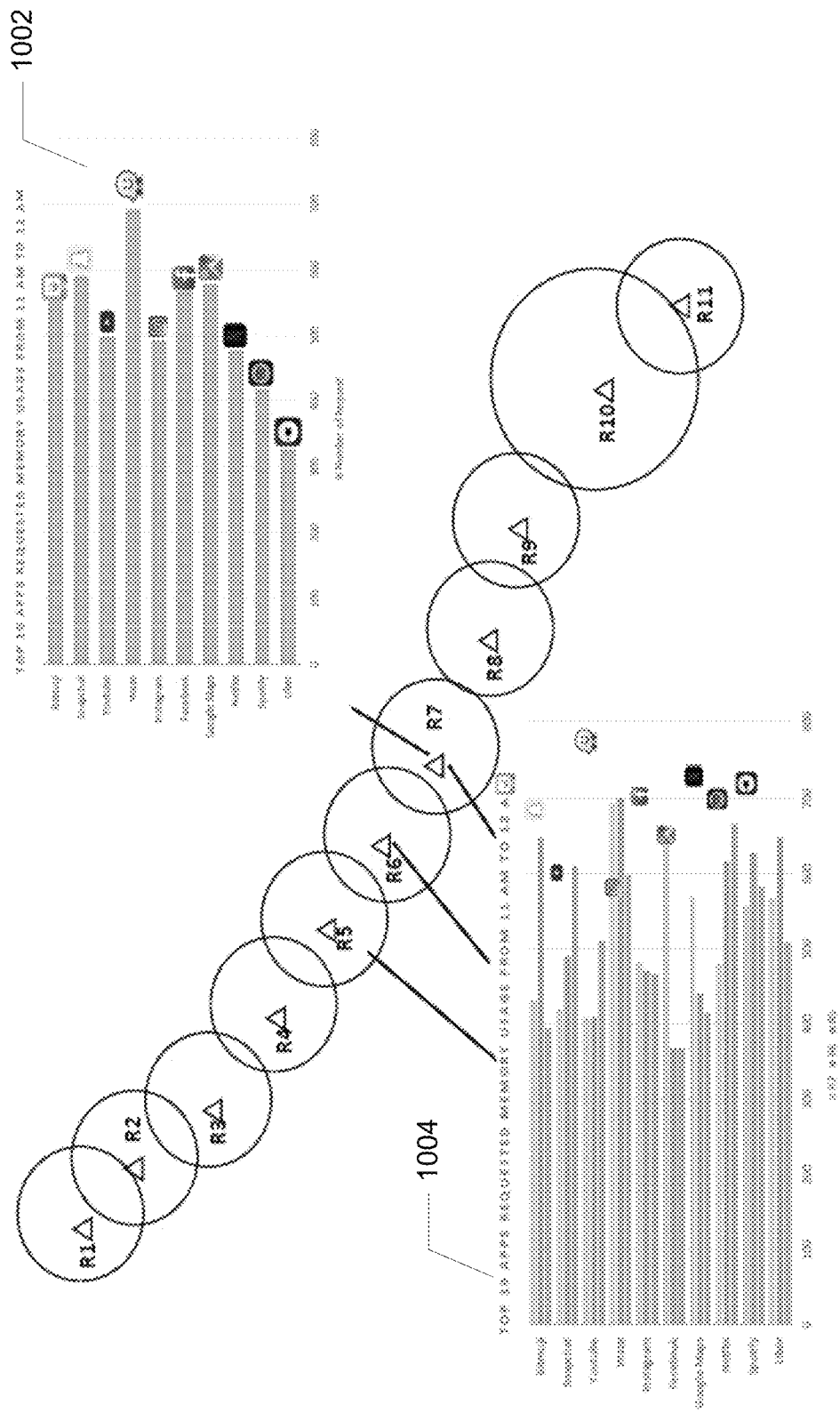
FIGS. 10A-10B are graphical representations illustrating an example reservation result describing types of top ten V2I applications on various infrastructure devices along a highway according to some embodiments.
Figure 10B:
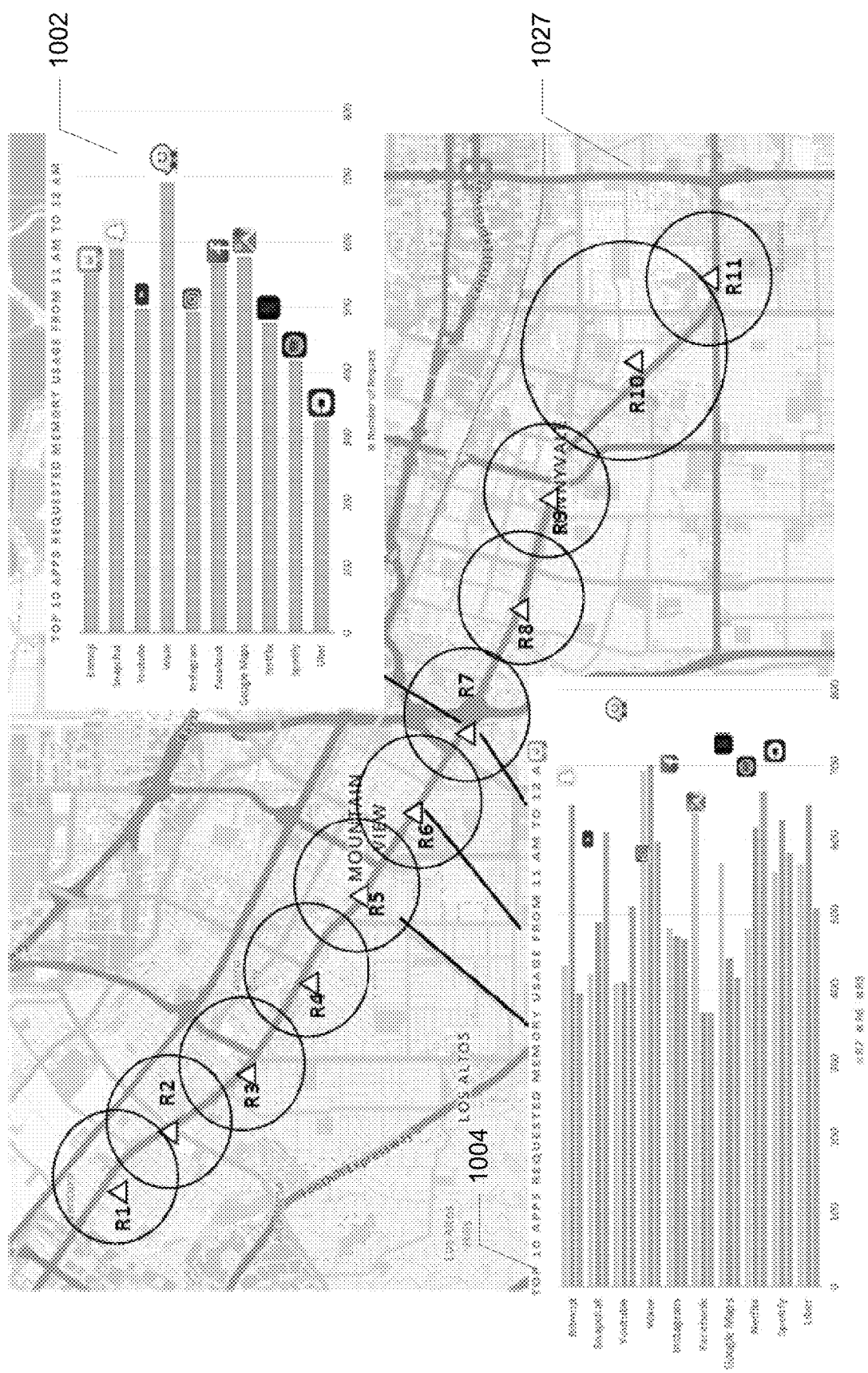

FIGS. 10A-10B are graphical representations illustrating an example reservation result describing types of top ten V2I applications on various infrastructure devices along a highway according to some embodiments. As illustrated in FIG. 10A, the reservation result shows: (1) a first reservation 1002 of a number of requests for each of the top ten applications on an infrastructure device R7; and (2) a second reservation 1004 of numbers of requests for the top ten applications on three infrastructure devices R5-R7 respectively. The first reservation 1002 is part of the second reservation 1004. Referring in FIG. 10B, the reservation result of FIG. 10A is superimposed on a base map 1027 to form a reservation-visualization map.

Figure 11A:
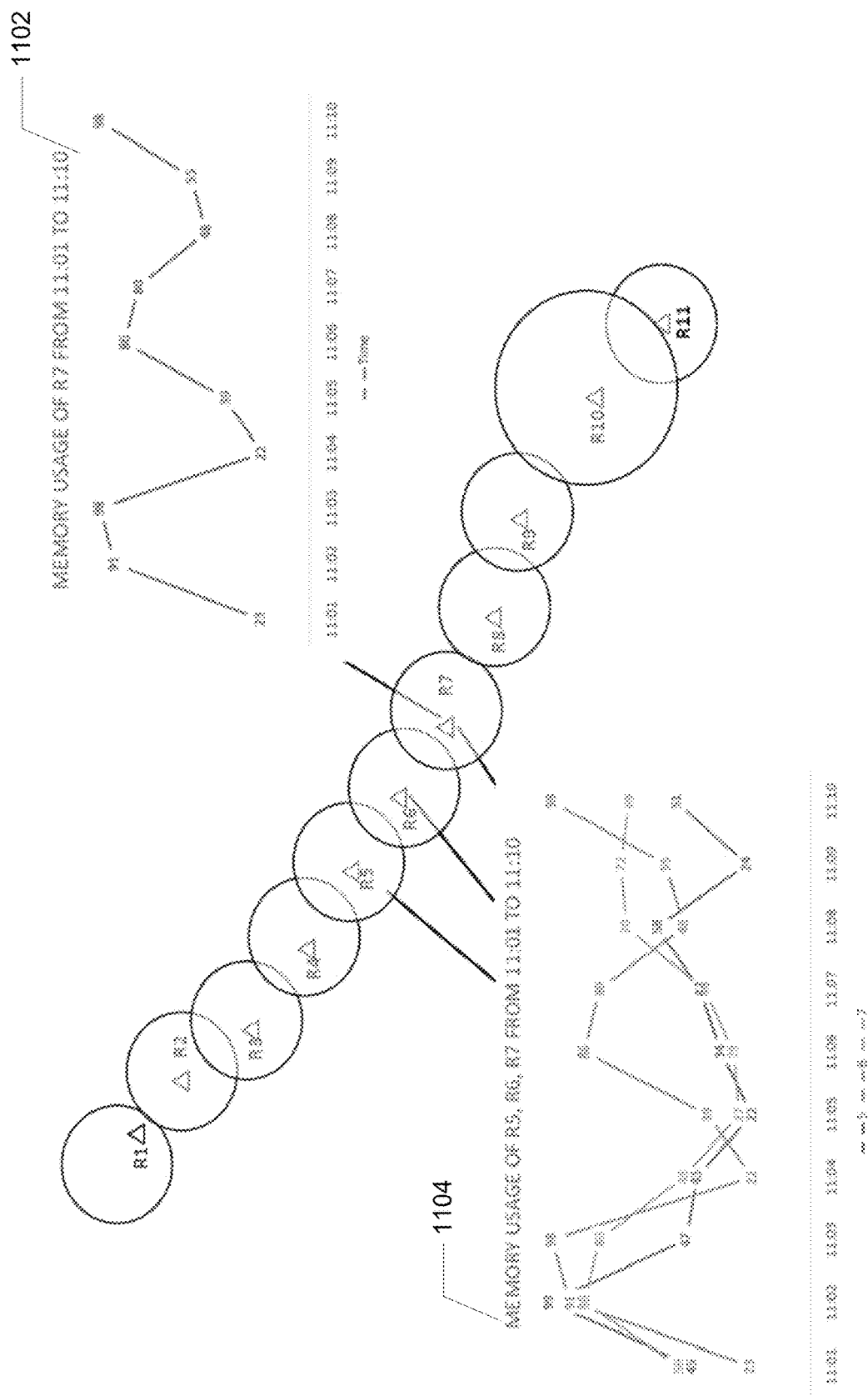
FIGS. 11A-11B are graphical representations illustrating an example reservation result describing memory usages on various infrastructure devices along a highway according to some embodiments.
Figure 11B:
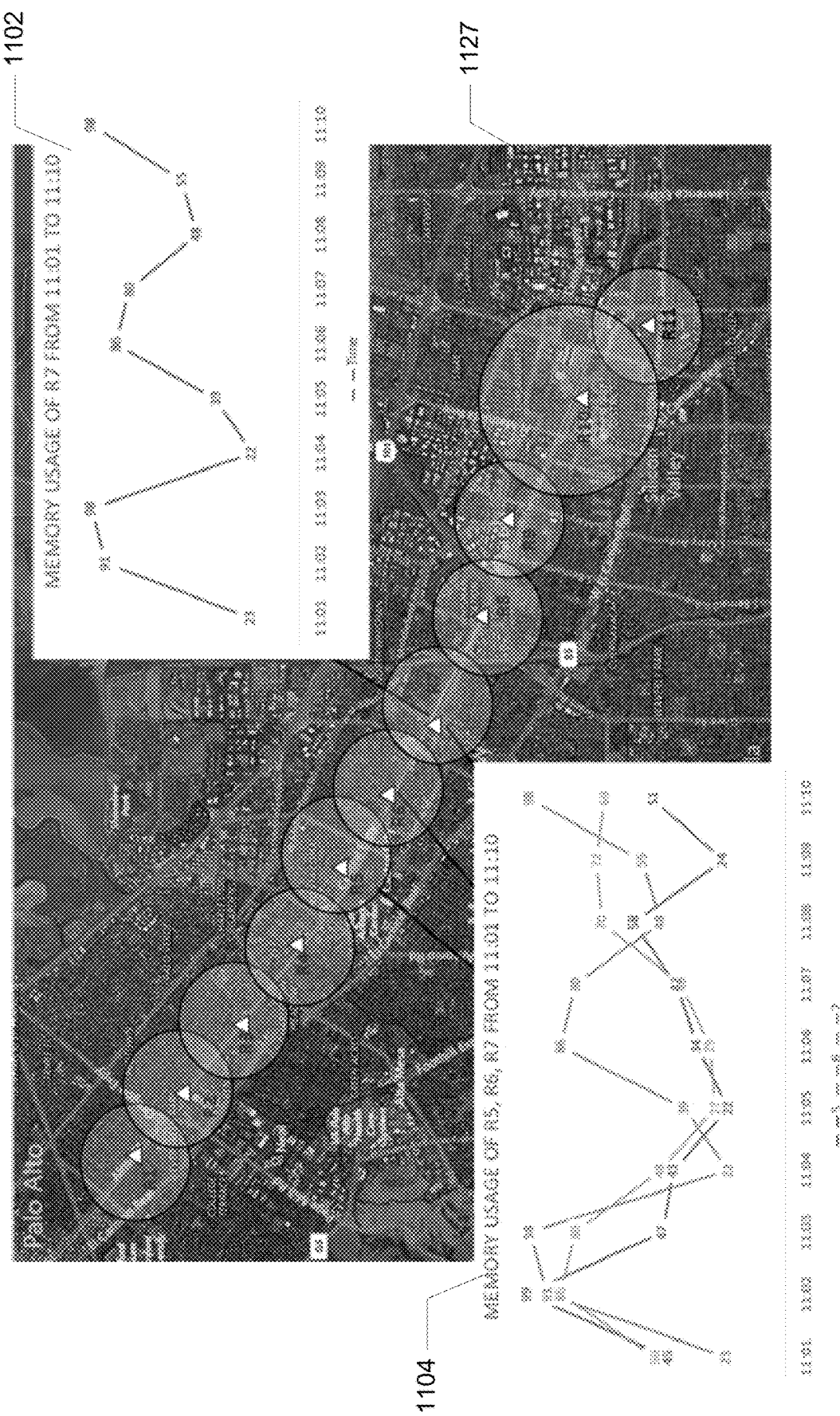

FIGS. 11A-11B are graphical representations illustrating an example reservation result describing memory usages on various infrastructure devices along a highway according to some embodiments. As illustrated in FIG. 11A, the reservation result shows: (1) a first reservation 1102 of a memory usage from 11:01 am to 11:10 am on an infrastructure device R7; and (2) a second reservation 1104 of memory usages from 11:01 am to 11:10 am on three infrastructure devices R5-R7 respectively. The first reservation 1102 is part of the second reservation 1104. Referring in FIG. 11B, the reservation result of FIG. 11A is superimposed on a base map 1127 to form a reservation-visualization map.

Figure 12A:
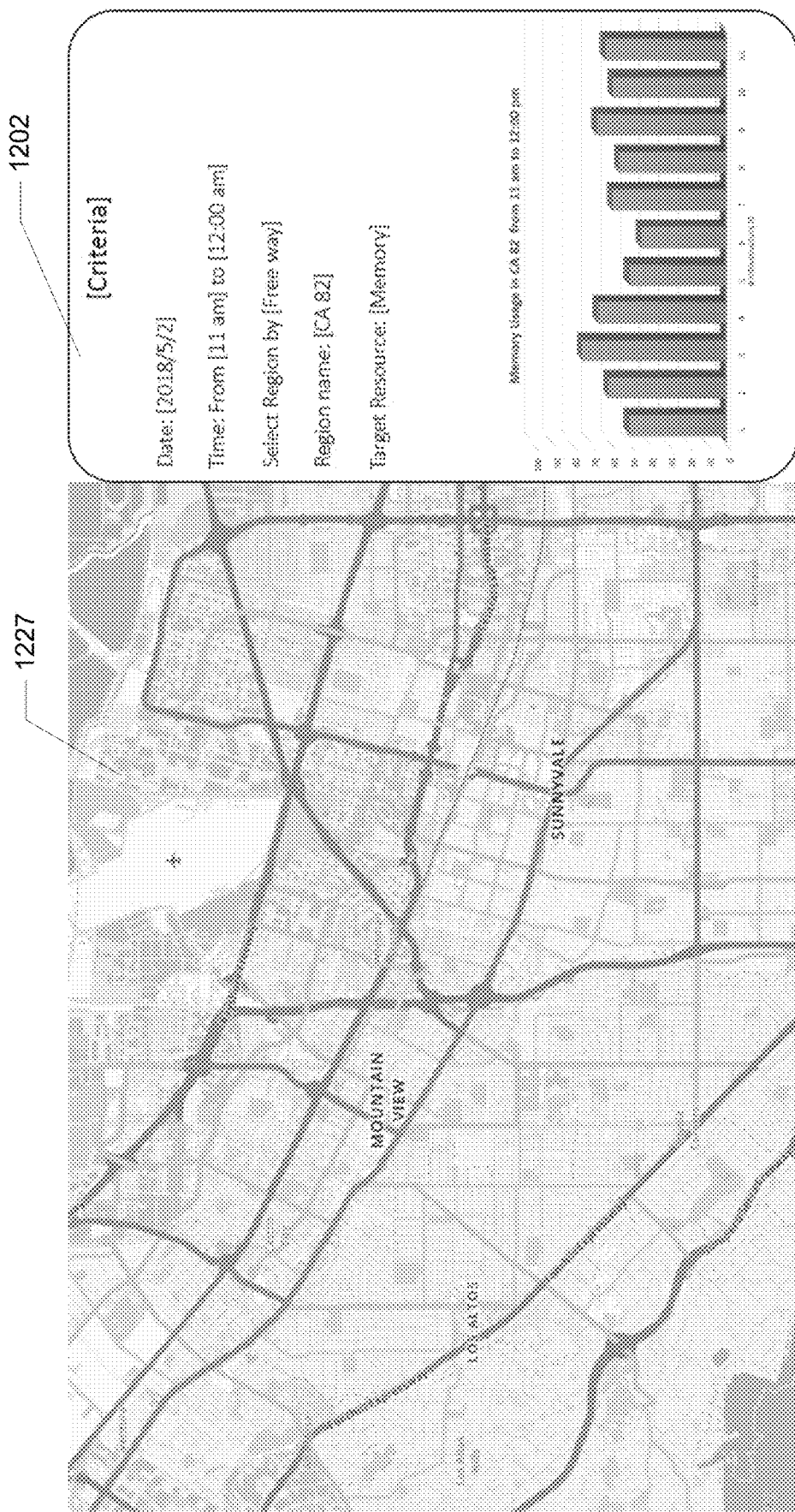
FIGS. 12A-12D are graphical representations illustrating an example resource reservation process for memory usages on various infrastructure devices along a highway according to some embodiments.
Figure 12B:
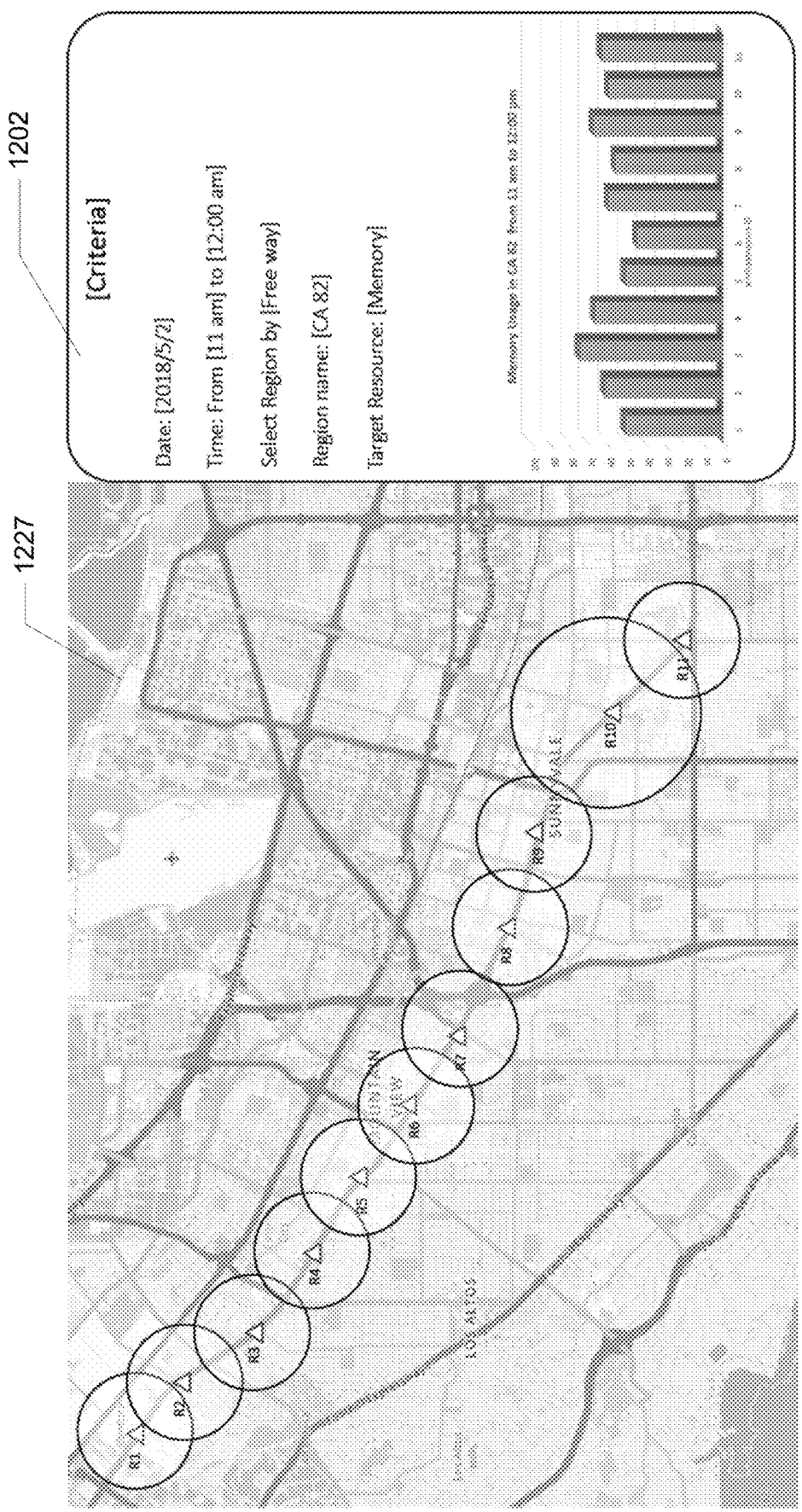

FIGS. 12A-12D are graphical representations illustrating an example resource reservation process for memory usages on various infrastructure devices along a highway according to some embodiments. FIG. 12A shows a base map 1227 and multiple filtering criteria 1202 including a date, a time, a selected region, a region name "CA 82" and a target resource. FIG. 12B shows eleven infrastructure devices R1-R11 in CA 82 selected in the filtering criteria 1202. In this case, a group of infrastructure devices R1-R11 is selected to reserve memory usages on these infrastructure devices.

Figure 12C:
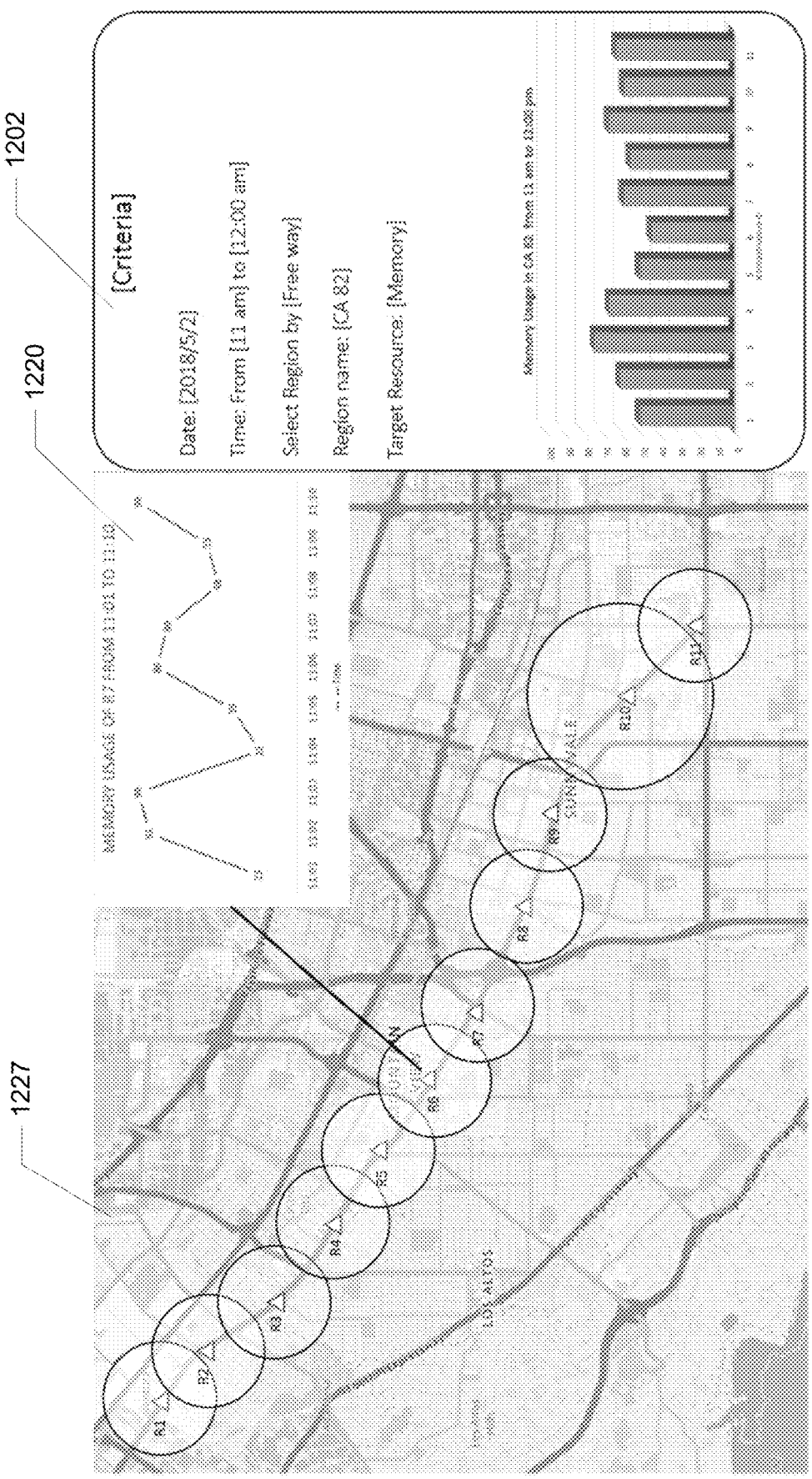
Figure 12D:
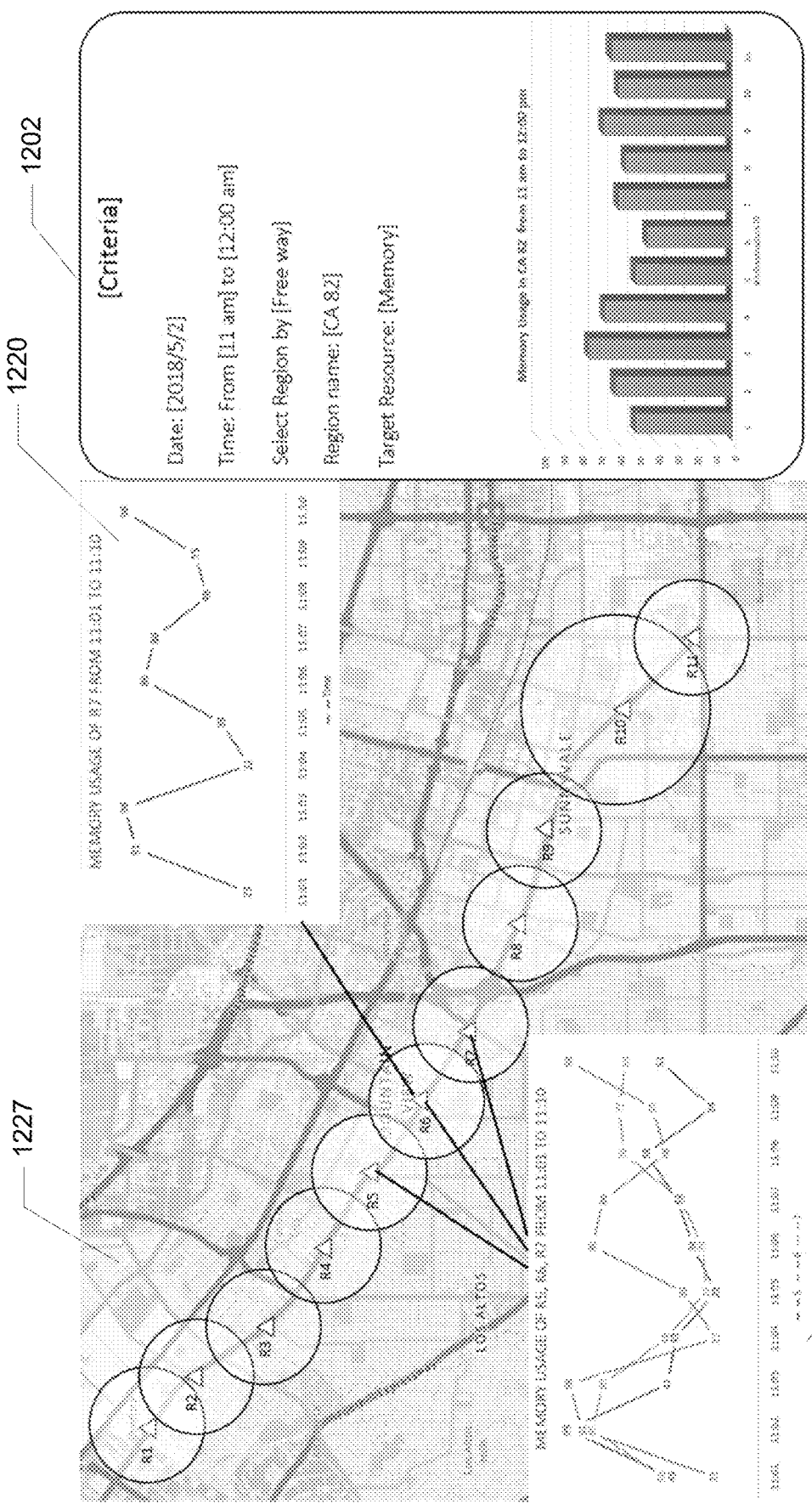

FIG. 12C shows a first reservation 1220 of a memory usage from 11:01 am to 11:10 am on an infrastructure device R6. FIG. 12D shows a second reservation 1224 of memory usages from 11:01 am to 11:10 am on three infrastructure devices R5-R7 respectively. The first reservation 1220 is part of the second reservation 1224. A reservation-visualization map is formed to include the base map 1227, the first reservation 1220 and the second reservation 1224.

Figure 13A:
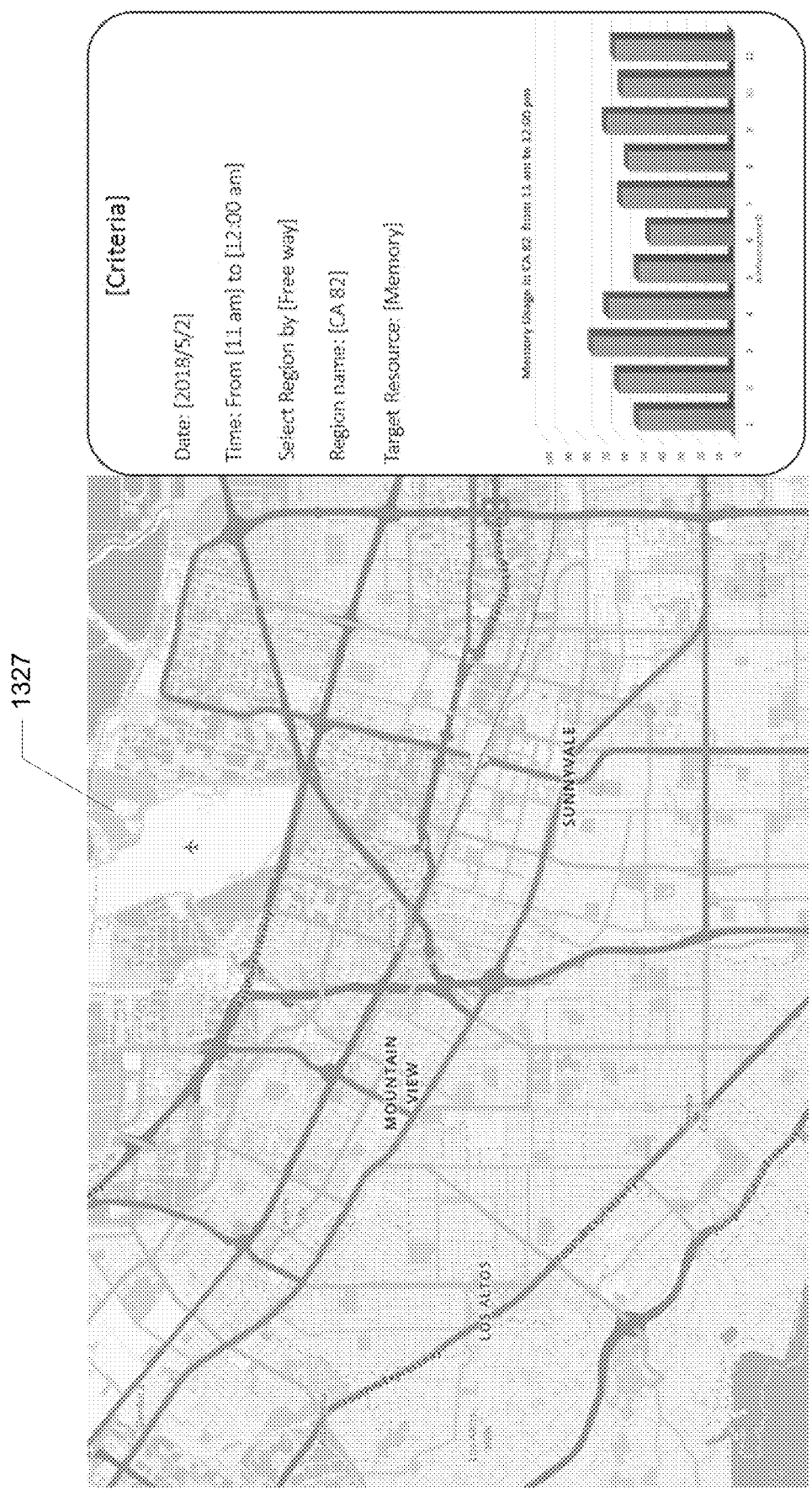
FIGS. 13A-13D are graphical representations illustrating an example resource reservation process for types of V2I applications on various infrastructure devices along a highway according to some embodiments.
Figure 13B:
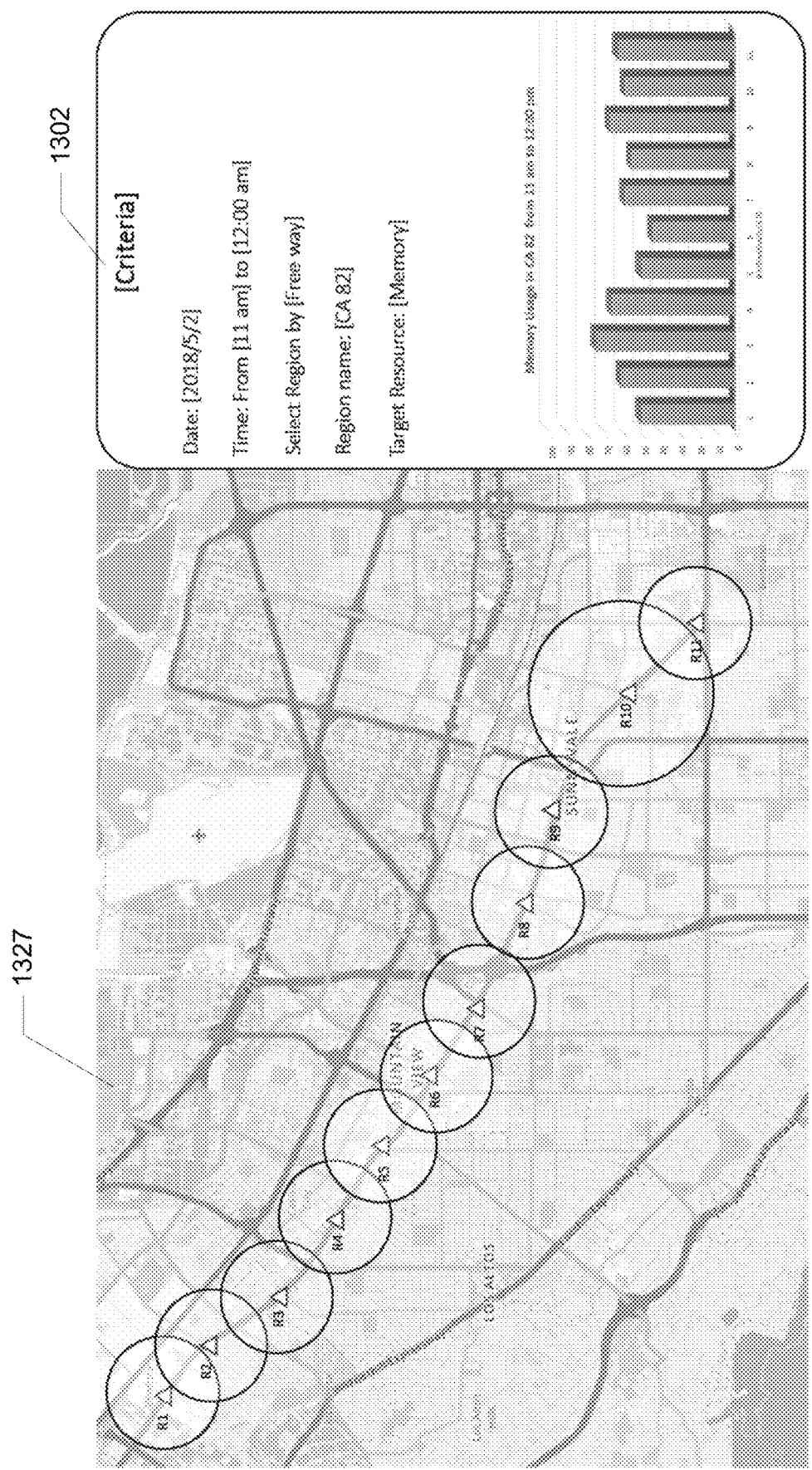

FIGS. 13A-13D are graphical representations illustrating an example resource reservation process for types of V2I applications on various infrastructure devices along a highway according to some embodiments. FIG. 13A shows a base map 1327 and multiple filtering criteria 1302 including a date, a time, a selected region, a region name "CA 82" and a target resource. FIG. 13B shows eleven infrastructure devices R1-R11 in CA 82 selected in the filtering criteria 1302. In this case, a group of infrastructure devices R1-R11 is selected to reserve numbers of application requests on these infrastructure devices.

Figure 13C:
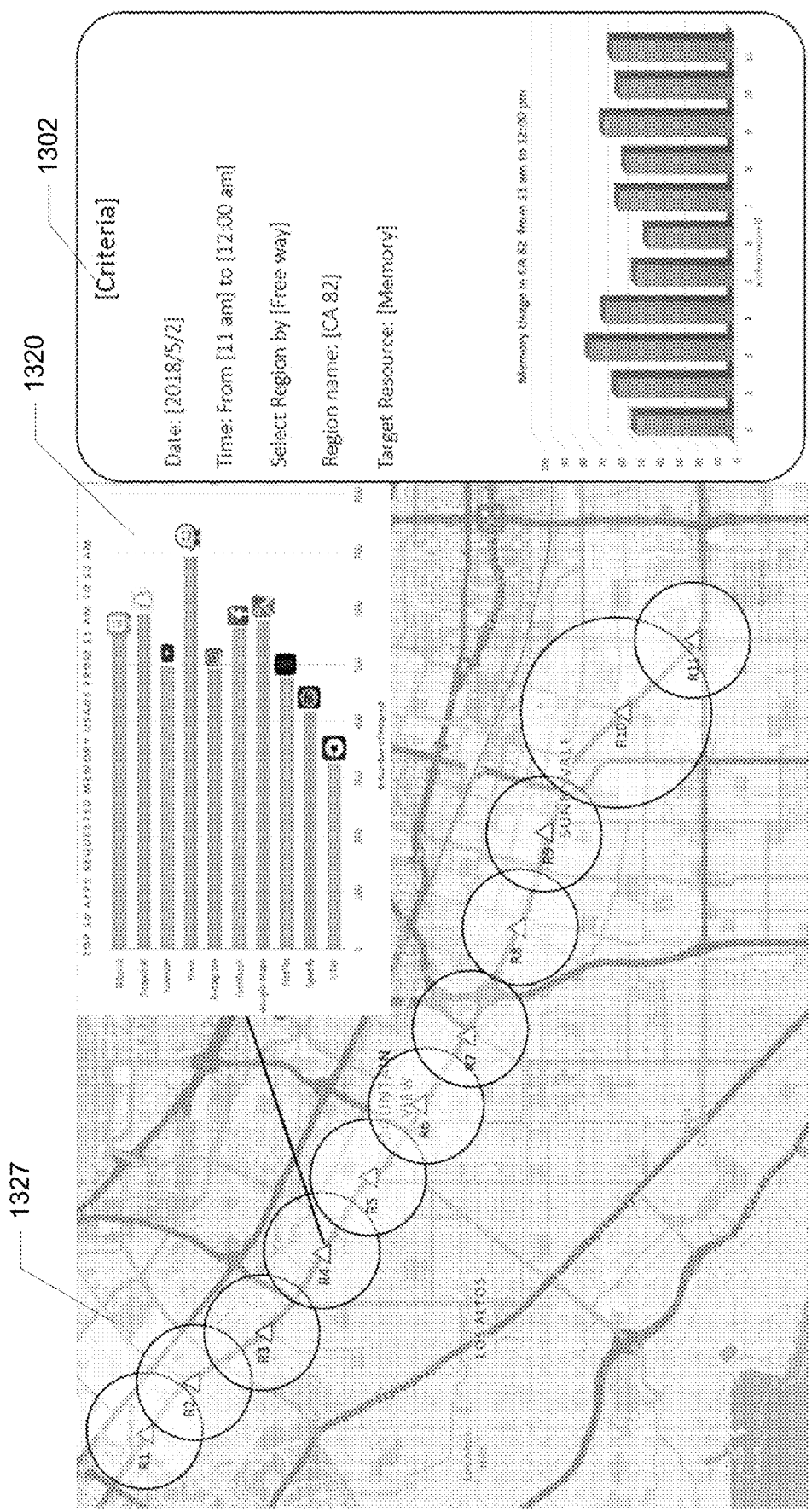
Figure 13D:
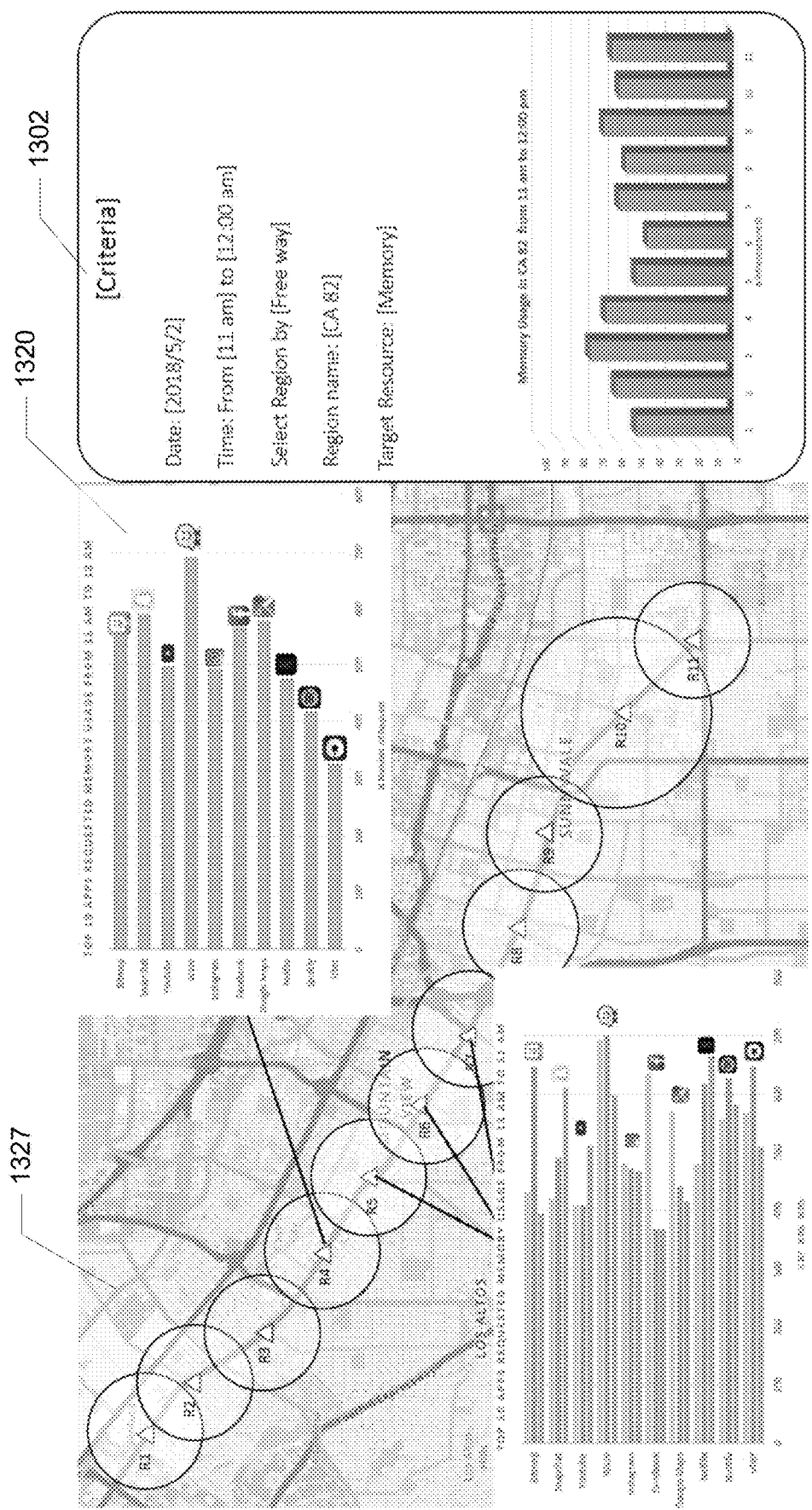

FIG. 13C shows a first reservation 1320 of a number of requests for each of the top ten applications on an infrastructure device R4. FIG. 13D shows a second reservation 1324 of numbers of requests for the top ten applications on three infrastructure devices R5-R7 respectively. A reservation-visualization map is formed to include the base map 1327, the first reservation 1320 and the second reservation 1324.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method comprising:
   monitoring an execution status of a reservation result on an infrastructure device, wherein the reservation result describes a reservation of an infrastructure resource on the infrastructure device for providing a vehicle-to-infrastructure (V2I) service;
   receiving feedback data describing the execution status of the reservation result from the infrastructure device;
   modifying one or more reservation criteria based on the feedback data, wherein the one or more reservation criteria are used to create the reservation result; and
   modifying the reservation result based at least in part on the one or more reservation criteria so that a shortage or an excess of the infrastructure resource for execution of the V2I service is avoided, wherein the avoidance of the shortage or the excess improves over time as more feedback data is received.

2. The method of claim 1, further comprising:
   retrieving infrastructure data from the infrastructure device;
   filtering the infrastructure data based on one or more filtering criteria to generate filtered data, wherein the filtered data satisfies the one or more filtering criteria; and
   creating the reservation result based on the filtered data and the one or more reservation criteria.

3. The method of claim 2, wherein creating the reservation result based on the filtered data and the one or more reservation criteria further comprises:
   comparing the filtered data with the one or more reservation criteria to determine an amount of the infrastructure resource to be additionally allocated or deallocated; and
   generating the reservation result that additionally allocates or deallocates the amount of the infrastructure resource on a scheduled time.

4. The method of claim 2, wherein the one or more filtering criteria include data describing one or more of: a region where an infrastructure resource of interest is located; a road of interest; a location of interest; an area of interest; a time range of interest; the infrastructure resource of interest; and a type of the infrastructure resource of interest.

5. The method of claim 2, wherein the infrastructure data includes data describing one or more of: a signal strength of the infrastructure device; a location of the infrastructure device; a memory usage of the infrastructure device; a processor usage of the infrastructure device; a storage usage of the infrastructure device; an uplink network usage of the infrastructure device; a downlink network usage of the infrastructure device; a total number of pass-through vehicles that goes by the infrastructure device; an average speed of the pass-through vehicles; a total number of resource requests from the pass-through vehicles; a total number of resource grants provided to the pass-through vehicles by the infrastructure device; and a total number of resource denials provided to the pass-through vehicles by the infrastructure device.

6. The method of claim 2, further comprising:
distinguishing an origin of the infrastructure data based on one or more of a confidence level of the infrastructure data and details in the infrastructure data.

7. The method of claim 1, further comprising:
monitoring a status of the infrastructure resource; and
updating the reservation result based on the status of the infrastructure resource in real time to improve allocation efficiency of the infrastructure resource.

8. The method of claim 1, further comprising:
importing a base map from a map provider; and
superimposing the reservation result on the base map so that the reservation result is visualized on the base map.

9. The method of claim 1, wherein the infrastructure resource reserved on the infrastructure device includes one or more of: data stored in the infrastructure device; computation power of the infrastructure device; memory of the infrastructure device; storage of the infrastructure device; a bandwidth of the infrastructure device; an uplink network bandwidth of the infrastructure device; a downlink network bandwidth of the infrastructure device; one or more V2I applications or services provided by the infrastructure device; and requests of the one or more V2I applications to be processed by the infrastructure device.

10. The method of claim 1, wherein the one or more reservation criteria include data describing one or more of: a minimum amount of the infrastructure resource to be reserved; a maximum amount of the infrastructure resource to be reserved; a type of a V2I application allowed during a time period; and a total number of requests allowed for the V2I application during the time period.

11. The method of claim 1, further comprising:
detecting an occurrence of an alert triggering event associated with the infrastructure resource; and
generating an alert message responsive to the occurrence of the alert triggering event.

12. The method of claim 11, wherein the alert triggering event includes an event indicating a violation of a usage of the infrastructure resource on the infrastructure device or an event describing that the usage of the infrastructure resource reaches an alert threshold.

13. A system comprising:
a processor; and
a non-transitory memory storing computer code which, when executed by the processor, causes the processor to:
monitor an execution status of a reservation result on an infrastructure device, wherein the reservation result describes a reservation of an infrastructure resource on the infrastructure device for providing a vehicle-to-infrastructure (V2I) service;
receive feedback data describing the execution status of the reservation result from the infrastructure device;
modify one or more reservation criteria based on the feedback data, wherein the one or more reservation criteria are used to create the reservation result; and
modify the reservation result based at least in part on the one or more reservation criteria so that a shortage or an excess of the infrastructure resource for execution of the V2I service is avoided, wherein the avoidance of the shortage or the excess improves over time as more feedback data is received.

14. The system of claim 13, wherein the computer code which, when executed by the processor, causes the processor further to:
retrieve infrastructure data from the infrastructure device;
filter the infrastructure data based on one or more filtering criteria to generate filtered data, wherein the filtered data satisfies the one or more filtering criteria; and
create the reservation result based on the filtered data and the one or more reservation criteria.

15. The system of claim 14, wherein the computer code which, when executed by the processor, causes the processor to create the reservation result based on the filtered data and the one or more reservation criteria at least by:
comparing the filtered data with the one or more reservation criteria to determine an amount of the infrastructure resource to be additionally allocated or deallocated; and
generating the reservation result that additionally allocates or deallocates the amount of the infrastructure resource on a scheduled time.

16. The system of claim 14, wherein the one or more filtering criteria include data describing one or more of: a region where an infrastructure resource of interest is located; a road of interest; a location of interest; an area of interest; a time range of interest; the infrastructure resource of interest; and a type of the infrastructure resource of interest.

17. The system of claim 14, wherein the computer code which, when executed by the processor, causes the processor further to:
distinguish an origin of the infrastructure data based on one or more of a confidence level of the infrastructure data and details in the infrastructure data.

18. The system of claim 13, wherein the computer code which, when executed by the processor, causes the processor further to:
monitor a status of the infrastructure resource; and
update the reservation result based on the status of the infrastructure resource in real time to improve allocation efficiency of the infrastructure resource.

19. The system of claim 13, wherein the computer code which, when executed by the processor, causes the processor further to:
import a base map from a map provider; and
superimpose the reservation result on the base map so that the reservation result is visualized on the base map.

20. A computer program product comprising a non-transitory memory storing computer-executable code that, when executed by a processor, causes the processor to:
monitor an execution status of a reservation result on an infrastructure device, wherein the reservation result describes a reservation of an infrastructure resource on the infrastructure device for providing a vehicle-to-infrastructure (V2I) service;
receive feedback data describing the execution status of the reservation result from the infrastructure device;
modify one or more reservation criteria based on the feedback data, wherein the one or more reservation criteria are used to create the reservation result; and
modify the reservation result based at least in part on the one or more reservation criteria so that a shortage or an excess of the infrastructure resource for execution of the V2I service is avoided, wherein the avoidance of the shortage or the excess improves over time as more feedback data is received.

* * * * *